Figure 1:
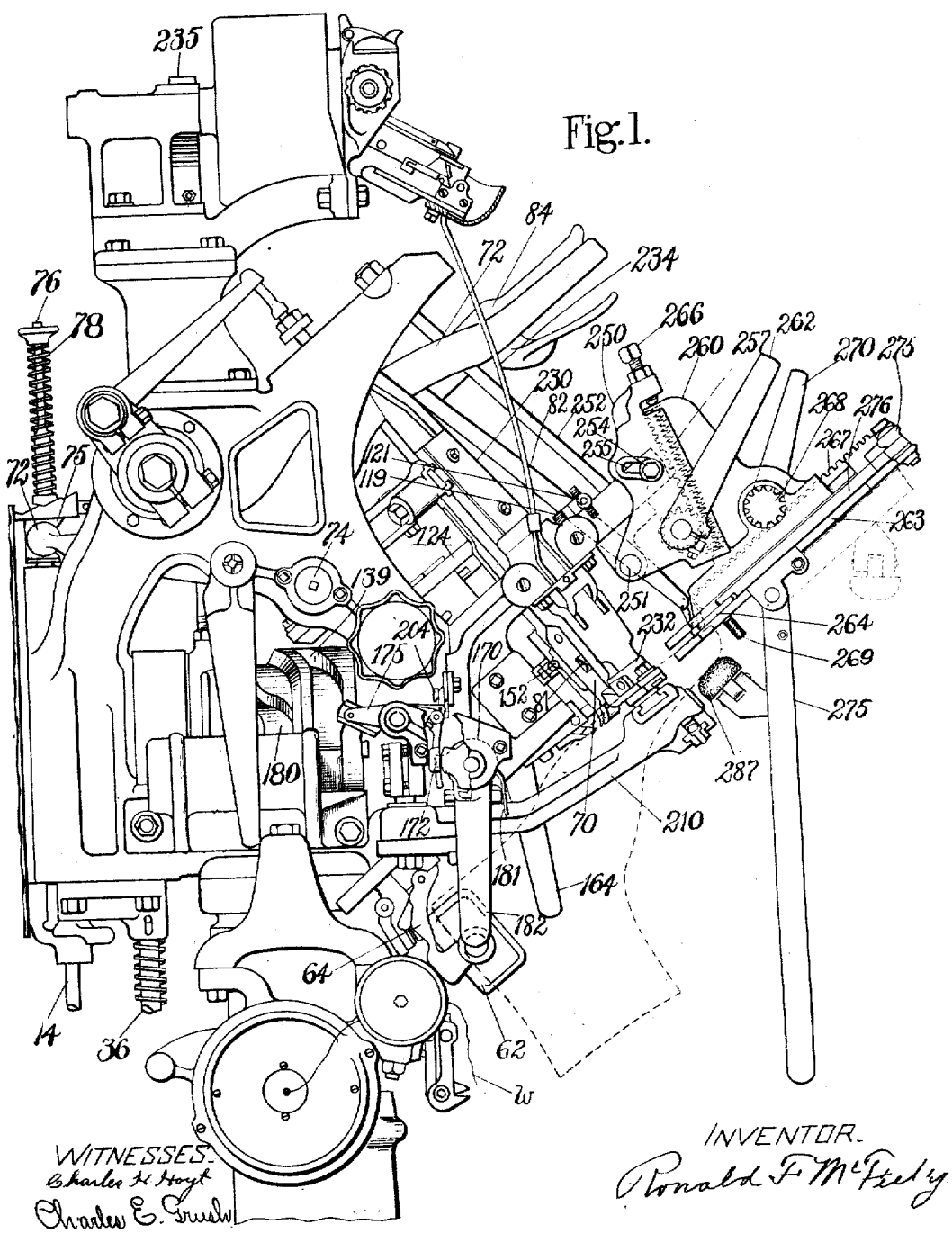

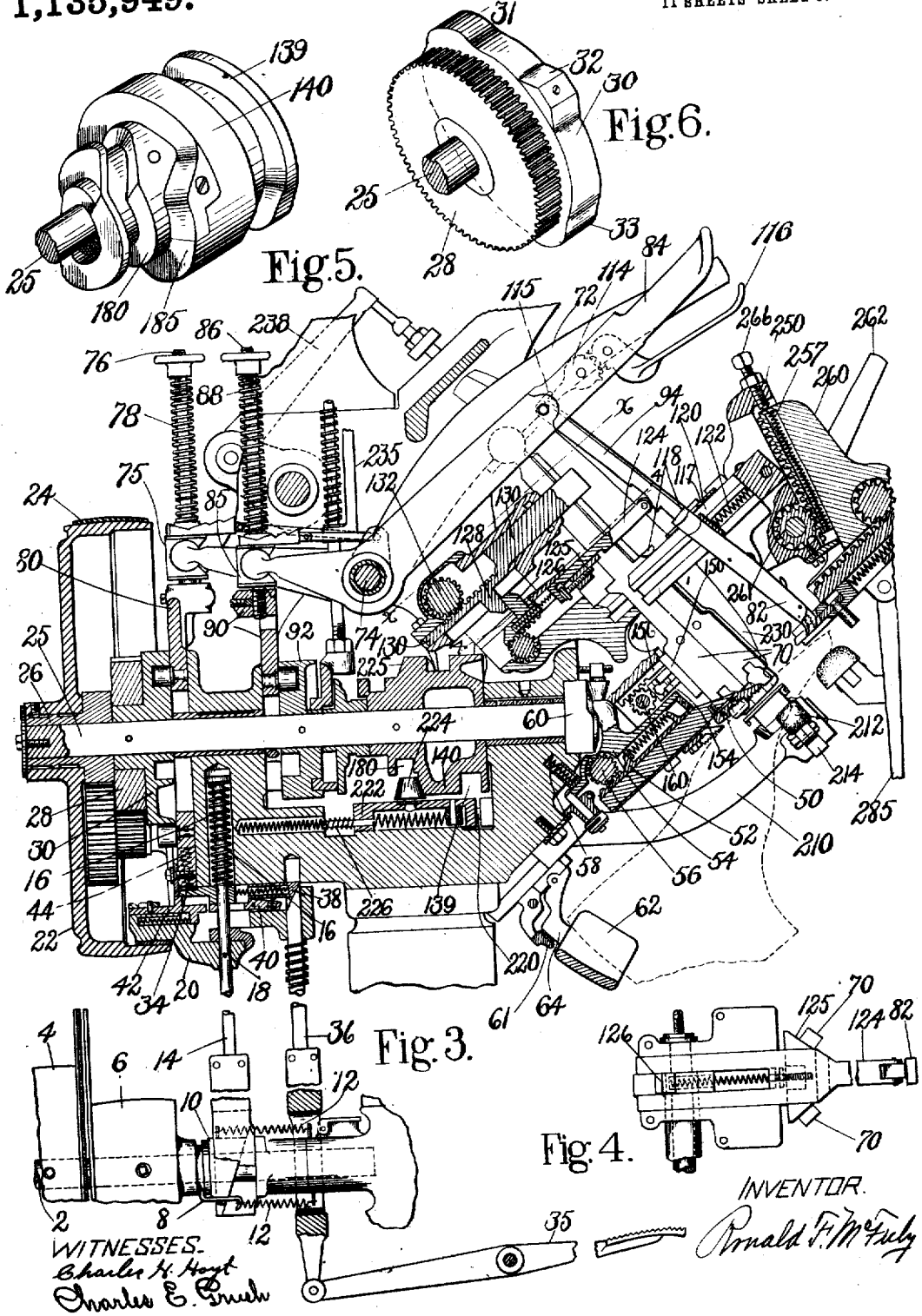

R. F. McFEELY.
MACHINE FOR USE IN THE MANUFACTURE OF BOOTS AND SHOES.
APPLICATION FILED MAY 6, 1907.

1,135,949.

Patented Apr. 13, 1915.
11 SHEETS—SHEET 4.

WITNESSES.
Charles H. Hoyt
Charles E. Brush

INVENTOR.
Ronald F. McFeely

R. F. McFEELY.
MACHINE FOR USE IN THE MANUFACTURE OF BOOTS AND SHOES.
APPLICATION FILED MAY 6, 1907.

1,135,949.

Patented Apr. 13, 1915.
11 SHEETS—SHEET 5.

WITNESSES
Charles H. Hoyt
Charles E. Brush

INVENTOR
Ronald F. McFeely

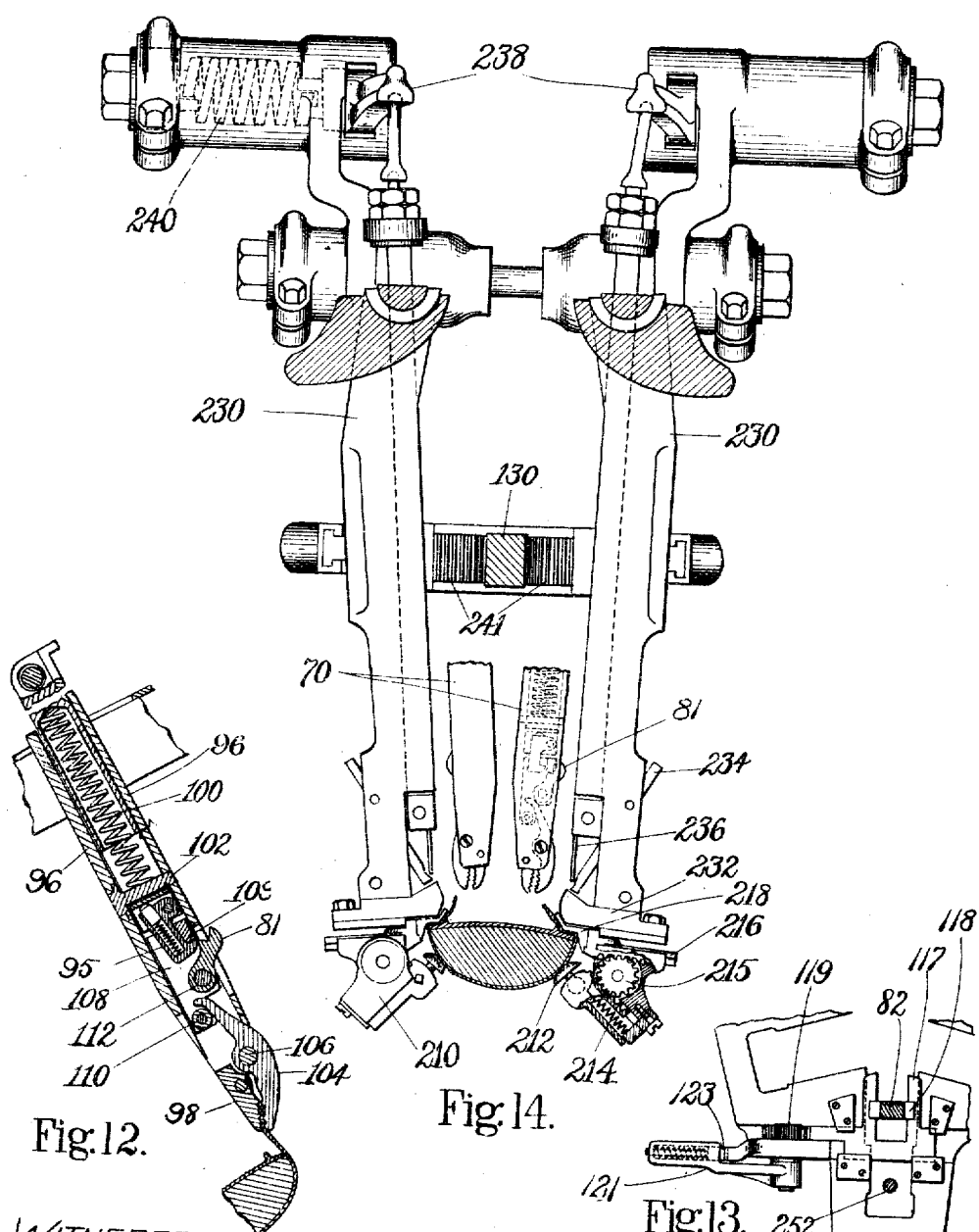

R. F. McFEELY.
MACHINE FOR USE IN THE MANUFACTURE OF BOOTS AND SHOES.
APPLICATION FILED MAY 6, 1907.

1,135,949.

Patented Apr. 13, 1915
11 SHEETS—SHEET 7.

WITNESSES.
Charles H. Hoyt
Charles E. Brush

INVENTOR.
Ronald F. McFeely

R. F. McFEELY.
MACHINE FOR USE IN THE MANUFACTURE OF BOOTS AND SHOES.
APPLICATION FILED MAY 6, 1907.

1,135,949.

Patented Apr. 13, 1915.
11 SHEETS—SHEET 8.

WITNESSES
Charles H. Hoyt
Charles E. Brush

INVENTOR
Ronald F. McFeely

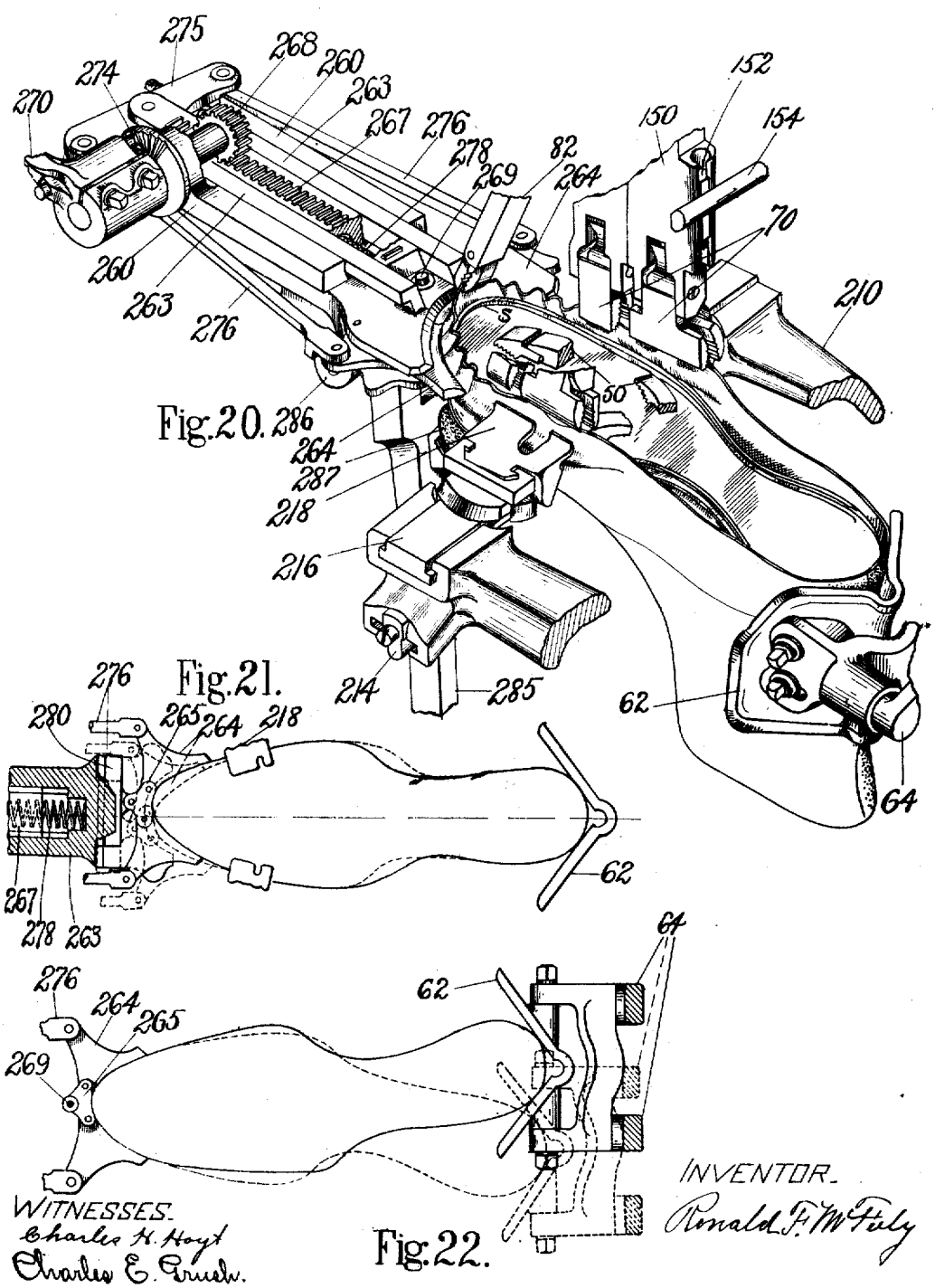

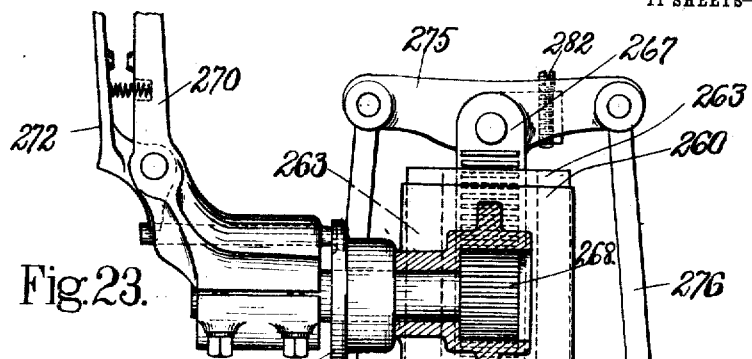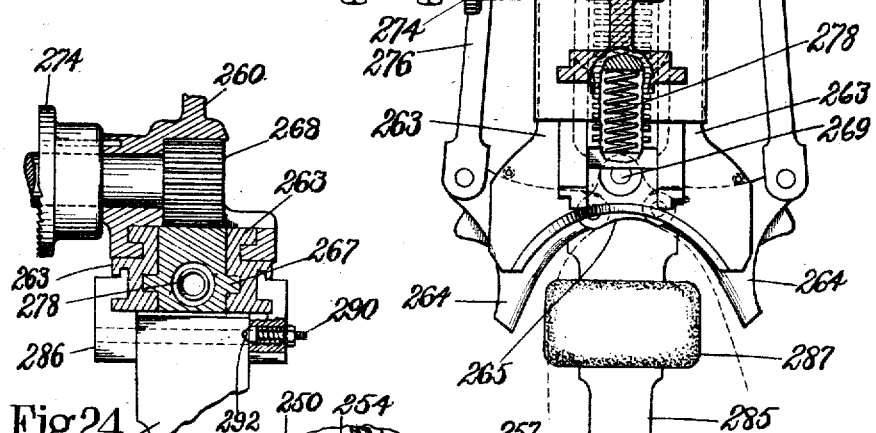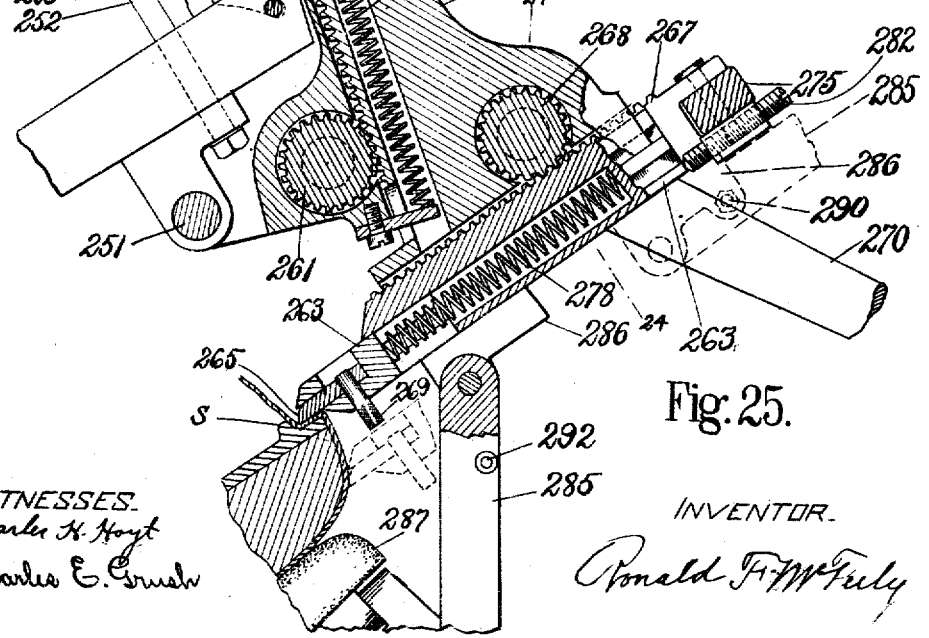

R. F. McFEELY.
MACHINE FOR USE IN THE MANUFACTURE OF BOOTS AND SHOES.
APPLICATION FILED MAY 6, 1907.

1,135,949.

Patented Apr. 13, 1915.
11 SHEETS—SHEET 11.

WITNESSES.
Charles H. Hoyt
Charles E. Brush.

INVENTOR.
Ronald F. McFeely

UNITED STATES PATENT OFFICE.

RONALD F. McFEELY, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR USE IN THE MANUFACTURE OF BOOTS AND SHOES.

1,135,949.      Specification of Letters Patent.      Patented Apr. 13, 1915.

Application filed May 6, 1907. Serial No. 372,055.

*To all whom it may concern:*

Be it known that I, RONALD F. MCFEELY, a citizen of the United States, residing at Beverly, in the county of Essex and Commonwealth of Massachusetts, have invented certain Improvements in Machines for Use in the Manufacture of Boots and Shoes, of which the following description, in connection with the accompanying drawings, is a specification, like reference characters on the drawings indicating like parts in the several figures.

This invention relates to the manufacture of boots and shoes and particularly to a machine for use in working an upper into position upon the last over which the shoe is made. In the manufacture of shoes as heretofore carried on it has been the custom to pull the assembled upper materials over the last and temporarily secure the upper in position by an operation prior to and entirely distinct from the step known as "lasting." This preliminary operation, known as "pulling-over" the shoe, was formerly done by hand, although more recently a machine has come into extensive use for this purpose. It has never heretofore been found practicable to combine in one machine means for pulling-over an upper and means for lasting it.

One of the chief objects of my invention is to produce such a machine. To this end an important feature of this invention consists in automatically operated means for gripping and pulling an upper combined with means for working the upper into lasted position. The pulling-over operation should include the step of adjusting the upper about the last to position the upper properly on the last and in this aspect the invention consists in the combination in one machine of means for pulling an upper over a last and adjusting the upper about the last with means for lasting the shoe. The pulling means preferably engages the upper and pulls it simultaneously upon opposite sides of the last and, preferably, also at the toe end of the last and then holds the upper under strain while such relative adjustments of the upper and last are effected as may be necessary for positioning the upper correctly upon the last. The pulling of the upper may advantageously be effected automatically while, as I am at present advised, the adjustment of the upper can best be made manually. The lasting means in the illustrated embodiment of the invention comprises wipers for forcing the upper into lasted position on the shoe bottom. As herein shown, the wipers are so constructed and arranged that they can be actuated for working the upper upwardly along the side face of the last toward and over the edge of the last bottom prior to wiping it inwardly into lasted position over the bottom of the last. Other lasting means of known or appropriate construction may obviously be used in practising the invention instead of the wipers employed in this embodiment of the invention and the lasting means may be operated either manually as herein shown or automatically as shown, for example, in my co-pending application, Serial No. 375,669, to work the upper into lasted position in any suitable way. The upper may be secured in lasted position by tacks, or a binder, or by any other suitable fastenings. As herein shown, mechanism is provided for inserting a plurality of tacks, one of which on each side of the shoe is designed to serve not only to fasten the upper to the innersole at that point, but as an anchor for a binder of wire or other continuous material which is extended around the toe of the shoe. Tacks might be driven in such numbers and so disposed as to be relied upon alone to hold the upper, as illustrated in my said application.

In the embodiment of the invention herein shown the last is supported with its bottom face upward in such a plane that the fore part of the upper is observable to the workman standing at the machine. The upper is pulled by means of grippers which are arranged and automatically actuated to seize and pull the upper at the opposite sides of the ball of the shoe, and preferably at the toe also. The machine then comes to rest to permit of the examination of the shoe and to give opportunity for the workman to make such adjustment of the upper as may be necessary to fit and position it properly upon the last. The grippers are so constructed and arranged that they can be moved relatively or together in directions for adjusting the upper around the last either transversely or longitudinally of the last. The transverse adjustment may be desirable, for example, to redistribute the stock on the fore part of the last and to position the front seam or the lace opening correctly with relation to the middle line of the last and to the lasting means. To permit these movements of the grippers their actuating mechanisms include springs and handles by which the operator is enabled to move the side grippers either independently or together in the same or in opposite directions for pulling the upper which extends between the two grippers transversely across or around the last. The grippers may also be moved to increase or relax the tension on one or both sides of the upper as an inspection of the shoe may show to be desirable for properly positioning and fitting the upper transversely on the last. The longitudinal adjustment of the upper on the last is frequently necessary for seating the upper squarely upon the ball and instep of the last and for straightening the toe tip and the seam which connects the tip to the vamp, it being important that the tip and seam shall be positioned alike in each upper of a pair of shoes. The toe grippers are arranged to be manually operated to increase or decrease the lengthwise pull on the upper for seating it on the instep and straightening a curved or bowed tip seam. Preferably the toe grippers may be manually released from the upper and reëngaged therewith, and in accordance with a feature of this invention the toe grippers are laterally movable so that they may be engaged with the upper at different points successively about the toe of the upper for pulling or positioning the upper as may be required with relation to the last and to the lasting means. Preferably and in accordance with another feature of the invention the toe grippers are operatively connected with actuating means by which lateral movement may be effected either for positioning them, as for example for crooked right and left lasts, or for actuating them to adjust or stretch the toe of the upper laterally. Bodily adjustment of the upper longitudinally about the last may be made by the side grippers which for this purpose are movable lengthwise of the last and preferably are connected with actuating means by which they can be moved together for adjusting the upper in either direction longitudinally around the last. The toe grippers may be moved in company with the side grippers, if desired, or they may be disengaged from the shoe leaving the upper free to be moved by the side grippers alone. The sole rest against which the bottom of the shoe is positioned is preferably connected with mechanism by which it is actuated to sink the last downwardly into the upper while the upper is under strain. The sole rest and also the heel rest against which the heel end of the last is supported are, as herein shown, adjustably connected with automatic mechanism by which said rests or either of them may be actuated to move the last forwardly into the pulled upper for straining the upper backwardly over the instep and the toe of the last. This movement of the last in the pulled upper conforms the upper to the contour of the last, particularly about the toe of the last and facilitates the operation of the lasting means in working the upper into lasted position about the toe of the last.

As herein shown the several operations of pulling-over, lasting, and tacking the shoe are performed with the shoe in a single position in the machine although the invention is not limited to machines in which the shoe remains in substantially the same position during these operations. Means is provided for supporting the shoe upwardly against the sole rest during the lasting and tack driving operations, said means occupying a retracted position, where it does not obstruct the workman's view of the shoe, during the pulling-over operation. The use of the supporting means enables the lasting wipers to be actuated not only to work the upper upwardly along the side face of the last and inwardly over its edge, but also to be employed for pressing the upper firmly down upon the last bottom to settle it into lasted position thereon and to form a seat for the binder, if a binder is to be used. Means for clamping the upper to the last at opposite sides of the shoe is preferably employed which is moved into holding position by the supporting means.

Another important feature of this invention consists in the novel construction and arrangement of the wipers and actuating mechanism therefor which are used in the illustrated embodiment of the invention for working the upper into lasted position. The wipers are arranged with relation to an actuator to position themselves automatically when they engage the shoe in accordance with the shape and preferably also the position of the end portion of the shoe. To this end the wipers are, as herein shown, yieldingly connected pivotally at their inner, adjacent ends to the actuator and are unyieldingly connected at their outer ends with the actuator by means of an equalizing device. This arrangement permits the wipers as they meet the shoe to yield at their inner ends while their outer ends move toward the shoe, and allows either wiper end first meeting the shoe to pause in its movement until the other wiper also comes into engagement with the shoe, after which the wipers, having adapted themselves to the shape of the shoe, may be advanced to wipe the upper inwardly over the edge of the shoe simultaneously at the end and sides of the toe portion of the shoe.

Another important novel characteristic of the preferred construction of the lasting mechanism is that the side wipers are connected together and to the actuator by a middle wiper or lasting plate having an acting edge forming a continuation of the edges of the side plates and connected to the actuator at a distance back from the acting edge of the wipers. This arrangement permits the wipers to have a bodily lateral movement to enable them to adapt their position to the position of the end portion of the last. It may be here observed that the fore part of the shoe always occupies approximately the same lateral position in the machine in order that it may be in operative relation to the several instrumentalities for working on the shoe; but in crooked lasts the lateral position of the ends of right and left lasts varies somewhat. In order to secure for the lasting devices a greater range of lateral movement which shall be ample in all cases to enable the wipers to position themselves squarely in front of the toe end of the last said wipers are, in a modified construction, connected to their actuator by a laterally sliding plate which allows the wipers a large extent of bodily lateral movement. Co-operating with the lasting means to hold the last against the backward thrust of the wipers is the heel rest, before mentioned, which preferably is laterally movable to adapt its position to the varying lateral positions of the heel ends of differently shaped lasts, particularly right and left crooked lasts, the heel ends of which are inclined in opposite directions from the median line of the fore parts of the lasts.

These and other features of the invention, including certain details of construction and numerous combinations of parts, will be fully explained in the following description and pointed out in the claims.

Certain improvements in methods of making shoes disclosed in this application are not claimed herein but are included in application Serial No. 386,572, filed August 1, 1907.

Figure 2:
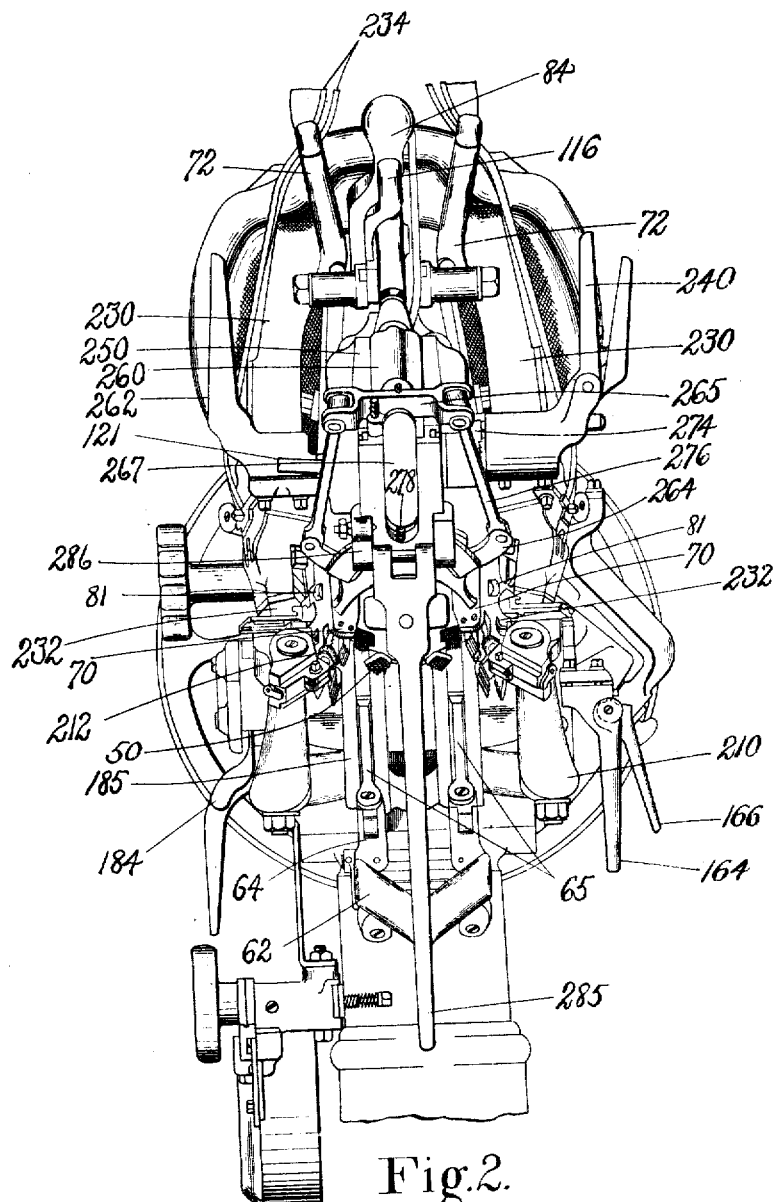
Figure 7:
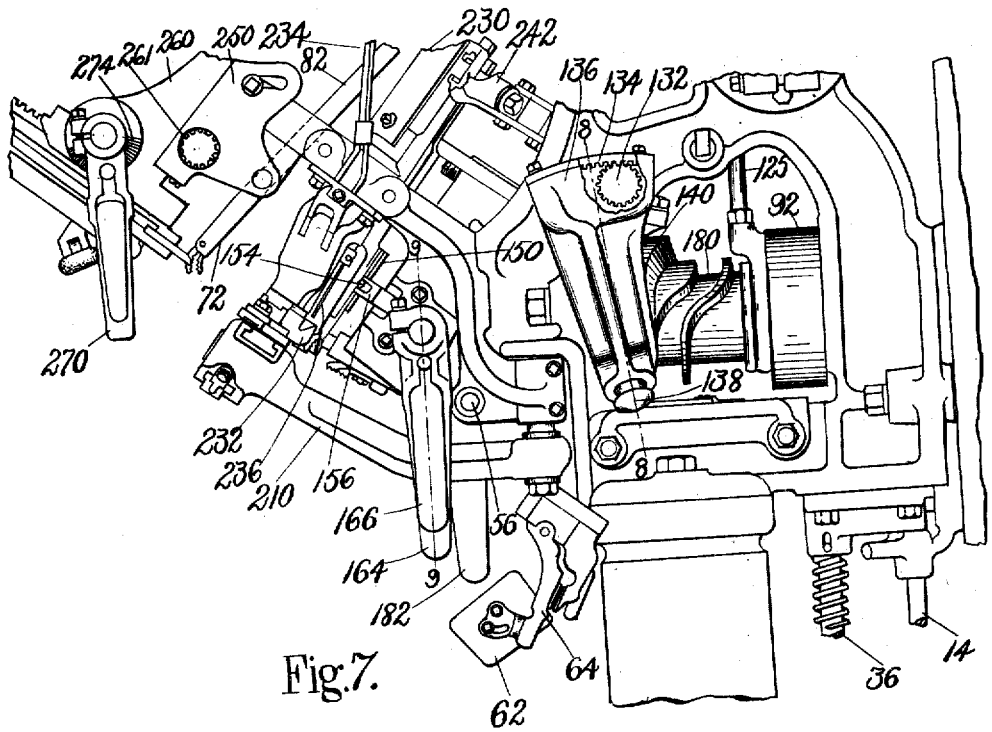
Figure 8:
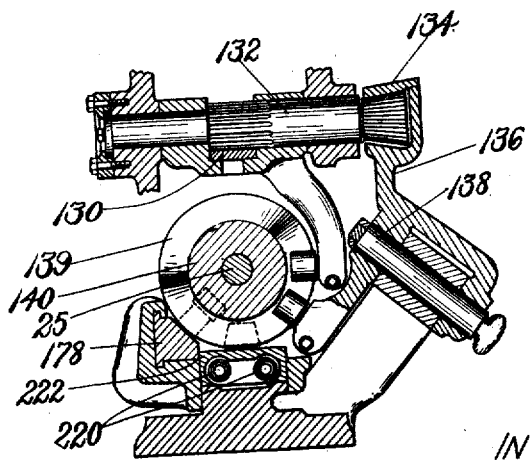
Figure 9:
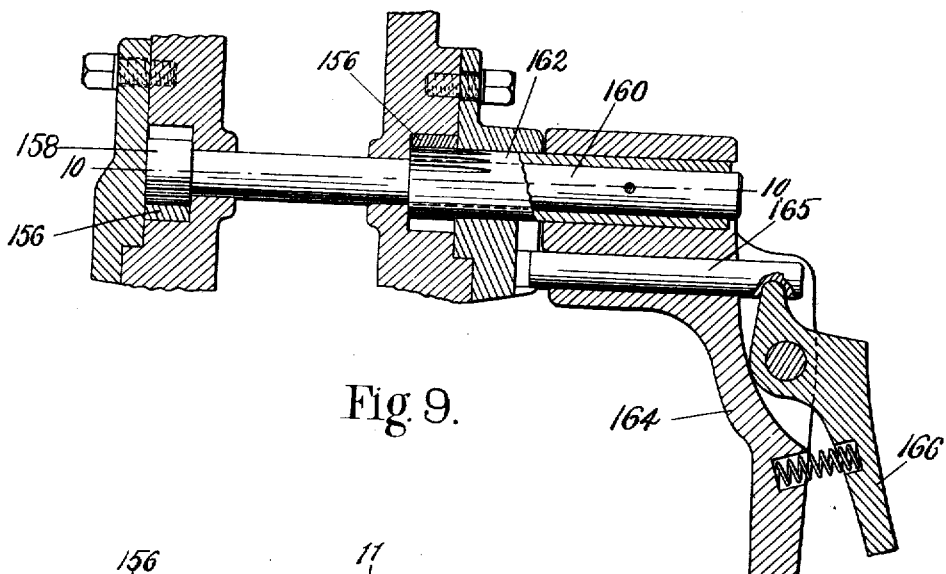
Figure 10:
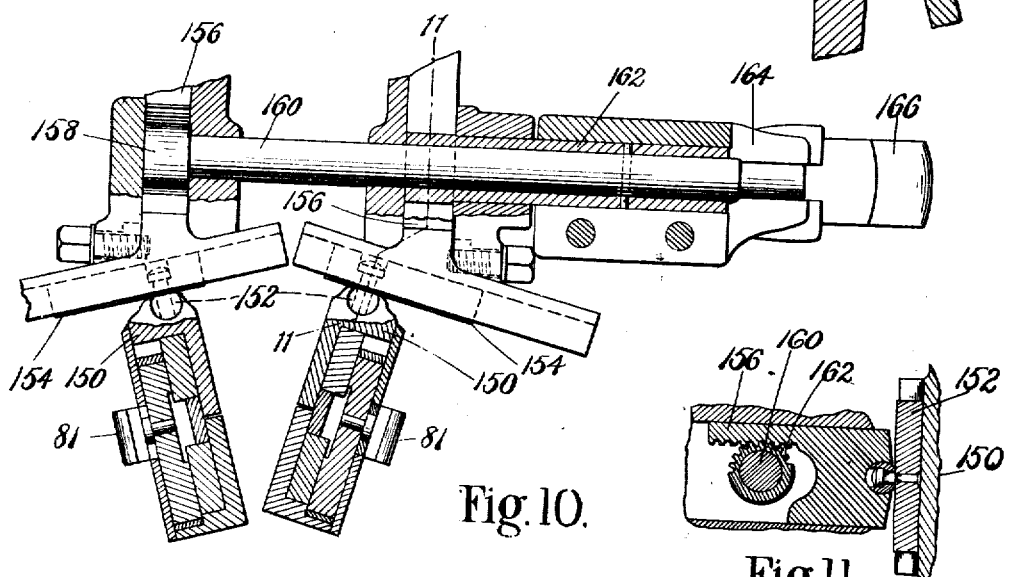
Figure 11:
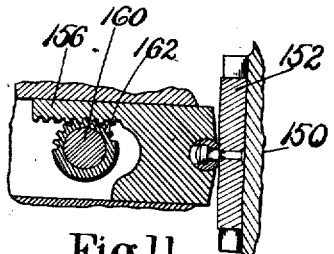
Figure 15:
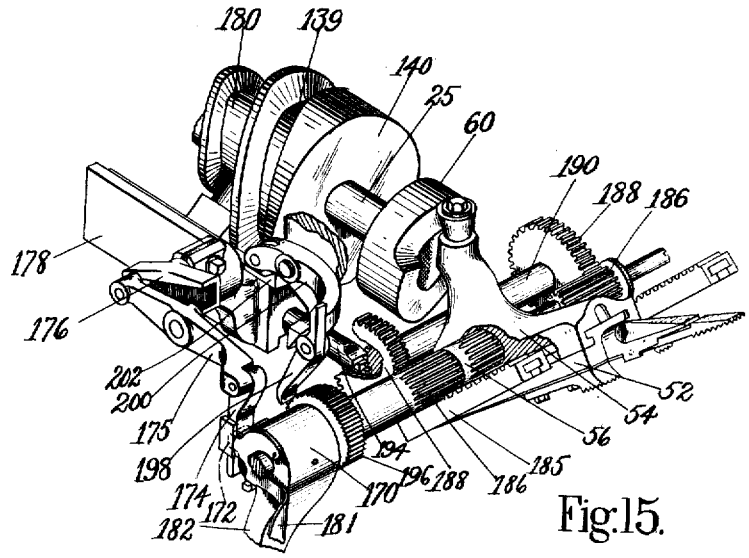
Figure 16:
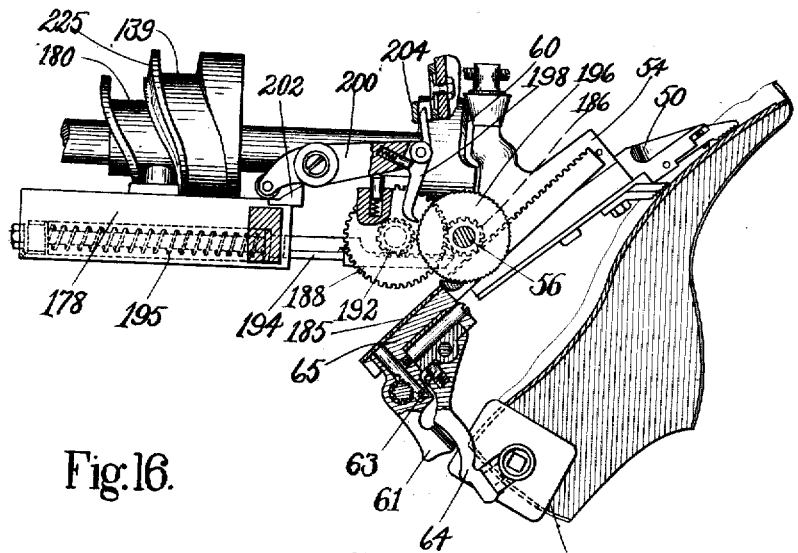
Figure 17:
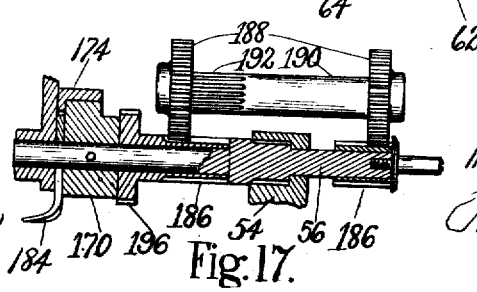
Figure 18:
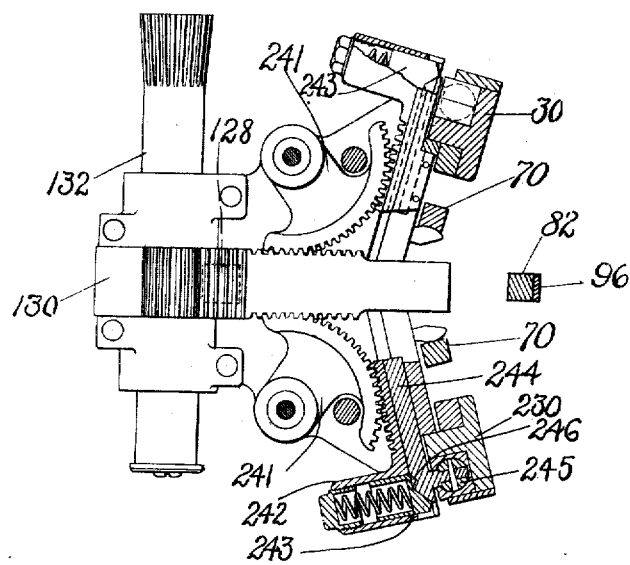
Figure 19:
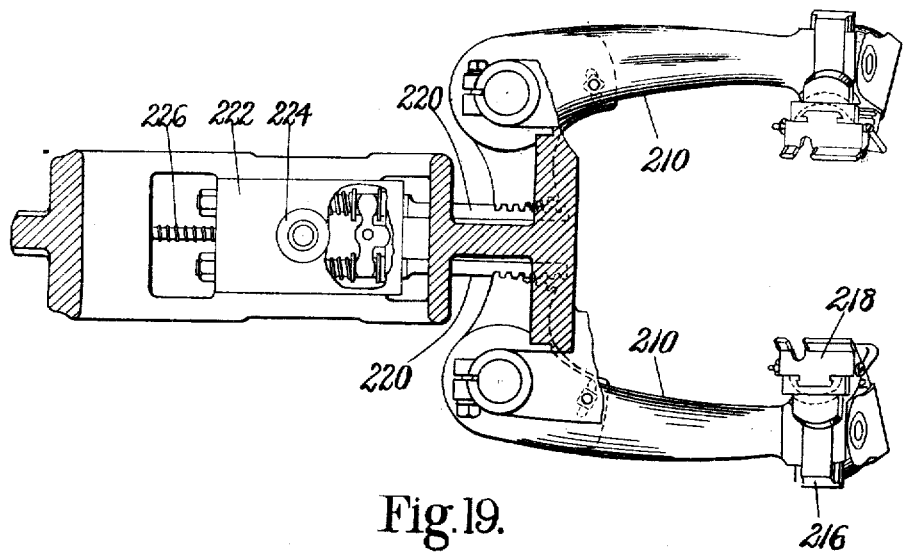
Figure 26:
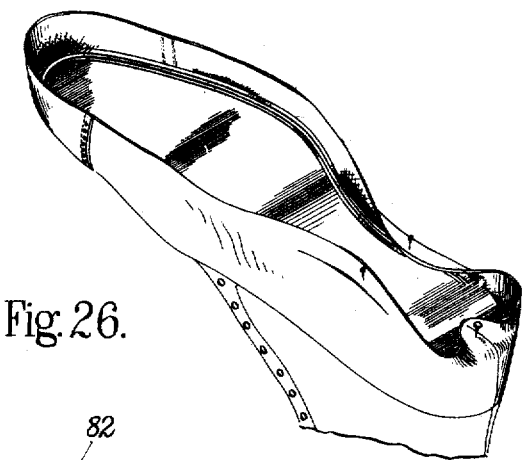
Figure 27:
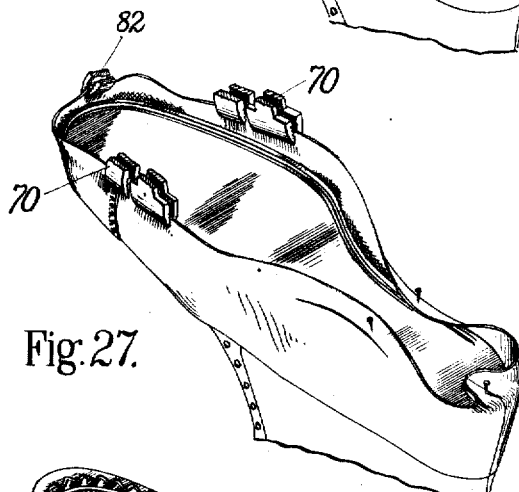
Figure 28:
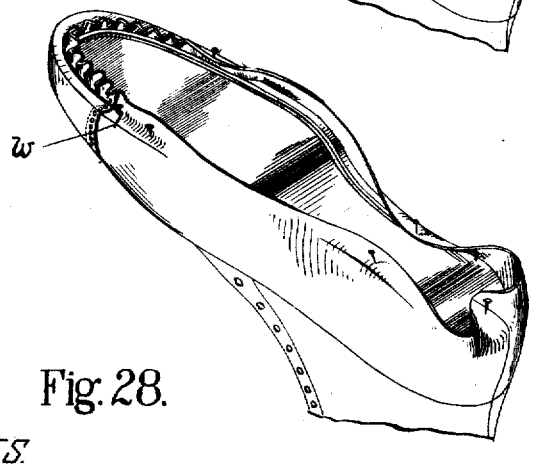

In the drawings, which represent a preferred embodiment of the invention,—Figure 1 is a side elevation of the machine showing in dotted lines a shoe in operative relation to the pulling-over and lasting mechanism. Fig. 2 is a front elevation of the machine; Fig. 3 is a vertical section in the plane of the main driving shaft; Fig. 4 is a plan view of the grippers operating mechanism as seen from substantially the plane 4—4, Fig. 3; Fig. 5 is a perspective view of the cam block 140; Fig. 6 is a perspective view of the cam which controls the stopping mechanism; Fig. 7 is an elevation of the lower portion of the head of the machine from the side opposite to that shown in Fig. 1; Fig. 8 is a sectional view on approximately the line 8—8 of Fig. 7; Fig. 9 is a section on the line 9—9, Fig. 7, to illustrate the mechanism for moving the side grippers to adjust the upper longitudinally about the last; Fig. 10 is a sectional view on the line 10—10 of Fig. 9, showing the mechanism for adjusting the side grippers; Fig. 11 is a section on the line 11—11 of Fig. 10; Fig. 12 is a vertical sectional view through the toe grippers, showing the preferred construction of these grippers; Fig. 13 is a detail view of mechanism for moving the toe grippers laterally or lengthwise of the edge of the last at the toe of the shoe; Fig. 14 is a front elevation, partly in section, of the mechanisms for supporting the shoe, clamping the upper after the side grippers release it, and inserting tacks at the opposite sides of the shoe; Fig. 15 is a perspective view of the sole rest and the mechanisms for actuating the rest; Fig. 16 is a side elevation, partly in section, showing a portion of the sole rest actuating mechanism and also the mechanism for actuating the heel rest; Fig. 17 is a view, partly in section, through the shaft 56, which also appears in Figs. 15 and 16; Fig. 18 is a plan view of the mechanism for moving inwardly and outwardly the arms carrying the mechanisms by which tacks are inserted at the sides of the shoe; Fig. 19 is a plan view of the mechanism for actuating the last supporting and shoe clamping devices; Fig. 20 is a perspective view showing the shoe clamping devices, the sole rest, the grippers, and the lasting mechanism in an operative relation to a shoe; Fig. 21 is a plan view showing in full and dotted lines two positions of a slightly modified arrangement of toe wipers with relation to shoes of different shapes; Fig. 22 is a plan view showing in full and dotted lines different positions assumed by the heel rest in supporting different shaped shoes with relation to the wipers mounted as shown in Fig. 20; Fig. 23 is a plan view of the toe lasting mechanism shown in Fig. 20; Fig. 24 is a sectional view on approximately the line 24—24 of Fig. 25; Fig. 25 is a vertical longitudinal section of the toe lasting mechanism on a larger scale than that used in the similar view shown in Fig. 3; Fig. 26 is a perspective view of a shoe as it may be prepared for presentation to the machine; Fig. 27 shows the shoe after the upper has been stretched and adjusted about the last in the pulling-over operation; and Fig. 28 is a perspective view of the shoe pulled over and lasted by the machine, the upper being secured in lasted position at the toe by a binder.

The pulley shaft 2 supports fast and loose pulleys 4 and 6 having upon their adjacent faces disks which form clutch members. The loose pulley has an annular groove in its hub engaged by a hook 8 carried by a collar 10 loose on the shaft and provided with an inclined face held by springs 12 in engagement with a similar face on the lower end of a rod 14, as illustrated in Fig. 3. The rod extends into the head of the machine and is acted upon by a spring 16 which presses it in the direction to cause the clutch members to be engaged. For lowering the rod and wedge to permit the clutch members to be disengaged by the springs 12 the rod is connected at 18 to a vertically movable brake shoe 20 adapted to engage the inner face of a pulley 22, which is driven by a belt 24 running over the loose pulley 6. The pulley 22 is fast to a sleeve shaft 26, which turns freely on the main shaft 25 of the machine. The sleeve shaft is formed at its inner end as a pinion which acts through intermediate gears to drive a pinion 28 which is fast to a cam 30. The pinion and cam are shown in section in Fig. 3 and in perspective view in Fig. 6. The cam has rises 31, 32, and 33, by means of which a vertical slide 34 is depressed for forcing the brake into contact with the pulley 22 and simultaneously depressing the rod 14 to permit the separation of the clutch members, thus stopping the machine. For permitting the brake and the rod 14 to be raised by the spring 16 a foot treadle 35 is connected to a rod 36 having on its upper end an inclined face in engagement with the inclined face of a horizontal slide 38, to which is pivoted a finger 40 adapted to engage, in its horizontal movement toward the left in Fig. 3, with a sliding block 42 and move the block from between the slide 34 and the brake shoe. As soon as the brake shoe is raised by spring 16, the sliding block 42, which rests on the brake, will be above the plane of the finger 40 so that the latter will present no obstruction to the return of the block 42 to its normal position as soon as the passing of the rise in the cam 30 permits the vertical slide 34 to resume its normal position under the influence of its lifting springs 44. The parts are thus immediately restored to their normal positions shown in Fig. 3 as soon as the machine has been advanced far enough after starting to carry any given rise past the slide 34. The parts are, therefore, in condition to cause the next rise in the cam 30 to stop the machine, even though the operator may not have removed his foot from the treadle 35. It will be understood that each rise in the cam 30 causes a rest in the machine's operation and the number of rises formed on the cam will depend upon the number of rests which it is desired to provide in one cycle of operation of the machine.

The shoe is prepared for the operation of the machine by assembling the upper materials and the innersole upon a last, as shown in Fig. 26, and the shoe is presented to the machine bottom upward, as illustrated in Fig. 3, against the sole rest 50 and is located lengthwise of the machine by engaging its toe and against the rear face of the toe gripper. The arrangement is such that the shoe is held in a plane at an oblique angle to the perpendicular so that the fore part of the upper is readily observable to a workman standing at the machine. The sole rest, which comprises fingers for engaging the sole at a plurality of points, is carried by a slide 52, which is movable longitudinally in the carrier 54. The carrier is mounted for pivotal movement about the axis of the shaft 56, being rocked in one direction by the spring 58 and actuated in the opposite direction by the cam 60 on the front end of the main shaft 25. The rest 62 for the heel end of the last has inclined sides and is carried by parallel links 64, which are pivotally supported to permit the heel rest to have a lateral movement for adapting its position to the lateral position of the heel end of the shoe. A serrated plate 61 is located just back of the links 64 and the heel rest is pressed back against said plate by the shoe to lock the rest from lateral movement while the shoe remains firmly against it. A spring plunger 63 holds the rest away from the serrated plate until the rest has been adjusted laterally by the shoe. Three grippers are arranged to engage the upper at the opposite sides of the ball of the last and at the toe of the last. The grippers 70, which engage the upper at the sides of the shoe and will be referred to as the "side grippers," are alike, one being shown in the side elevation of the machine in Fig. 1 and the other in the sectional view shown in Fig. 3, and each is suspended by a ball and socket joint from a lever 72, which is fulcrumed on a rod 74 and extends to the rear of the machine where it engages a block 75. Each block is mounted for vertical movement upon a rod 76, a spring 78 being interposed between the block and a nut on the upper end of the rod. Both rods are connected at the lower end to a vertically sliding plate 80, having a roll standing in a groove in the front or right-hand face of the cam disk 30 before mentioned. By means of this cam the gripper levers 72 are positively moved in the direction to lower the grippers and are yieldingly moved through the springs 78 in the direction to uplift the grippers for pulling the upper. The grippers shown are arranged to be automatically opened by the engagement of tack-carrying arms hereinafter described with tripping devices 81 which project from the outer sides of the grippers as shown in Figs. 12 and 14. The detailed construction of the side grippers by means of which they are caused to open and close is not herein illustrated in detail as the same forms no part of the present invention and any suitable construction may be employed such, for example, as that shown in prior Patent No. 1,030,264.

The grippers engaging the upper at the toe of the shoe, which will be referred to as the "toe grippers" 82, are suspended from their operating lever 84 by a connection which permits the grippers to have a forward and backward swinging movement and also a slight lateral movement. The lever 84 is pivoted on the rod 74 and its rear end is connected to a block 85 which is movable vertically on a rod 86, a spring 88 being interposed between the block and a nut on the rod. The rod is connected at its lower end with a vertically sliding plate 90 having a roller standing in a groove in the face of a cam block 92. Through these connections the toe grippers are positively moved downwardly and are yieldingly uplifted. The detailed construction of the toe grippers mechanism is illustrated in Fig. 12. The gripper bar 94, which is the member that is pivoted to the lever 84, extends downwardly through the casing 96 and has rigidly secured to its lower end a gripper jaw 98. The bar has a longitudinal opening in which is located a spring 100 resting at its lower end upon a plate 102 extending through the bar 94 from the casing on one side to the casing on the other side. The spring normally presses the casing downwardly with relation to the bar and by so doing closes the grippers and tends to maintain them in closed position. This result is secured by pivoting the gripper jaw 104 to the casing at 106 and providing a closing device 108 normally connected to the bar by a pivoted latch 95 which engages under a shoulder 109 on the closing device and may be moved by the releasing device 81 to disengage the closing device from the bar and permit the grippers to open. The closing device is provided on its lower end with members 110, 112 between which the upper arm of the gripper jaw 104 is guided to rock said jaw toward and from the fixed jaw. The expansive force of the spring 100 holds the member 110 normally in engagement with the upper arm of the gripper jaw 104, thus maintaining the grippers closed. By moving the casing upwardly with relation to the bar 94 the movable gripper jaw is drawn upwardly between the members 110, 112 and rocked in the direction for opening the grippers. This upward movement of the casing may be effected manually after the grippers have seized the upper by a lever 114, see Fig. 3, pivoted in the lever 84 and engaging a lug 115 on the upper end of the gripper casing.

The lever 114 is provided with teeth engaged by teeth on a hand lever 116, also pivoted to the operating lever 84. By manipulating the lever 116 and moving the grippers either vertically or laterally the toe grippers may be caused to release the upper and engage it at a different point. A movable guide 117 for the toe grippers is mounted upon the front bracket of the machine frame, as shown in Figs. 3 and 13. The guide has a laterally extending arm provided with rack teeth engaged by a pinion 119 to which is connected a hand lever 121. A spring-actuated locking device 123 carried in the lever engages notches in a fixed plate. By manipulating the hand lever 121 the toe grippers may be moved laterally while they are holding the upper under longitudinal strain, thus moving the upper lengthwise of the edge of the last at the toe and changing the direction of the strain. The grippers may also be shifted laterally to position them before they grip the upper.

The toe grippers and also the side grippers are completely opened at the end of a cycle of the operation of the machine and held in position to receive the upper of the next shoe by the engagement of shoulders 118 on the gripper casing with a portion 120 of the frame of the machine, as shown in Fig. 3, it being understood that the gripper actuating levers 72 and 84 are unyieldingly moved by their operating mechanism in the direction to lower the grippers.

The grippers are normally held spread apart against the pressure of springs 122 by mechanism including a slide 124 engaging at its outer end with the toe grippers and having an adjustable wedge plate 125 for engaging the side grippers, as shown in Fig. 4. The slide is actuated automatically in the direction to spread the grippers by the engagement of a lug 126 with a lug 128 on the slide 130, which is provided on its upper face with rack teeth engaging teeth on a shaft 132, as shown in the longitudinal vertical section of the machine illustrated in Fig. 3 and also in Figs. 8 and 18. The shaft has on one end teeth which are engaged by a rack bar 134 secured to a lever 136, which is fulcrumed on a pin 138 and has a roller extending in a cam groove 139 in a cam block 140 on the main driving shaft 25.

The casing 150 for the side grippers has formed in its rear edge a guideway for a block 152, the rear edge of which is secured to a slide 154 movable transversely of the machine in a guide formed in the head of a toothed-plate 156. This construction is best shown in Fig. 10 and reference may also be had to Figs. 1 and 3. The toothed bars 156 connected with the two side grippers mechanisms are alike except that the teeth on one of said bars are on the upper side of the bar and the teeth on the other bar are formed on the lower side. The left-hand bar is engaged, as shown in Figs. 9 and 10, by a pinion 158 on a shaft 160, while the bar 156 for the right-hand grippers is engaged with teeth on a sleeve shaft 162 secured to the shaft 160. The shafts 160, 162 may be turned by a hand lever 164, which, by reason of the arrangement described, will move the side grippers simultaneously lengthwise of the last and in opposite directions,—that is, one side gripper will be moved toward the heel of the last while the other side gripper is moved toward the toe of the last. A locking pin 165, controlled by a finger piece 166, secures the hand lever 163 in normal position in which the two side grippers are directly opposite each other. The foregoing mechanism, known as the tip straightening mechanism, is one example of the means for relatively adjusting the pulled upper and the last. In the present embodiment of the invention such adjustment comprises a movement of the upper relatively to the last while the last is held stationary. The engagement of the three serrated feet of the sole rest (Fig. 20) with the shoe bottom maintains the last stationary while the upper is moved.

The slide 52, on which the sole rest is mounted, is provided, as shown in Fig. 3, with teeth which engage a toothed portion of the shaft 56 about which the carrier 54 is rocked. The shaft 56 has on its left-hand end, see particularly Figs. 15 and 17, a collar 170 having on its rear side a lug 172 normally engaged by a latch 174 on the front end of a lever 175. The lever is fulcrumed to the frame and its rear end stands in an inclined guideway in the block 176 carried by a slide 178, which is provided with a roll standing in a cam groove 180 in the cam block 140. The block 176 is adjustable to permit the inclination of its guideway to be reversed, and according to the position of the block the shaft 56 will be rotated in one or the other direction to move the sole rest forwardly or backwardly during the rotation of the cam block 140. The collar 170 has a depending arm or handle 182 on which is mounted a lever 184 arranged to disengage the latch 174 from the collar. When these parts have been disengaged the sole rest may be manually moved by the handle either forwardly or backwardly.

The heel rest is connected by the parallel links 64 with slides 65 adjustable forwardly and backwardly in the guides 185, which are provided with teeth on their upper faces engaged by pinions 186, 186 loose on the shaft 56. These pinions are in turn engaged by pinions 188 fast on the shaft 190, which is provided with gear teeth at 192 that engage with a rack formed on the front end of a rod 194. The rod extends into the block 178 by which it, and therefore the heel rest, is yieldingly actuated through the medium of a spring 195.

The pinion 186 near the left-hand end of the shaft 56 is provided with a toothed collar 196. A pawl 198 is carried by the front end of a lever 200, which is fulcrumed on the frame and extends in the rear of a wedge 202 on the upper side of the block 178. The arrangement is such that the lever 200 will be engaged and actuated by the wedge 202 during the last portion of the rearward movement of block 178 effected by the cam groove 180. This actuation of the lever 200 will, through the pawl 198 and pinion 196 and other connections above described, move the heel rest unyieldingly forward. An adjustable pawl controller 204 determines the time at which the pawl 198 shall engage the pinion 196 and thus determine the extent of this positively effected forward movement of the heel rest.

Supports for the last are carried by arms 210 arranged for movement from separated position, where they are away from the last, into a position under the opposite sides of the last. The supports, which are cushioned blocks 212, are mounted on slides 214, as shown in Fig. 14, said slides having teeth engaging a pinion 215, which also engages teeth on a bar 216 that carries a clamping device 218 which advances inwardly over the last bottom with a rubbing action adapted to lay the upper into lasted position under it, Figs. 14, 20 and 28. The pinion 215 serves as an equalizer by which the clamping device is forced into holding engagement with the upper on the edge of the last when the support 212 is pressed against the shoe. The arms 210 are formed as bell crank levers, the inner ends of which are provided with teeth in engagement with rack bars 220, see Fig. 19. The rack bars are actuated by a slide 222 through intermediate yielding connections not necessary here to describe. The slide has a cam roll 224 which is acted upon by a cam face 225 formed on the rear end of the cam block 140. A spring 226 presses the slide forwardly, holding the roll against the cam and thus effecting the withdrawal of the supports and clamping devices from the shoe when the contour of the cam face 225 permits this movement.

The tack driving mechanism includes arms 230 depending from the frame at the upper portion of the machine and provided at their lower ends with tack carrying blocks 232 to which tacks are supplied by tubes 234 from a tack supplying mechanism mounted in the upper portion of the machine and actuated by a rod 235 having rack teeth upon its upper portion, shown in Fig. 1, and connected at its lower portion with an eccentric formed on the front face of the cam block 92, see Fig. 3. The arms 230 also carry driver bars for actuating the drivers 236. The driver bars are impelled downwardly for driving tacks by levers 238 actuated by coiled springs 240, a separate spring and lever being provided for each driver bar. The arms 230 of the tack driving mechanism normally occupy a laterally retracted position where they are out of the way of the devices for operating upon a shoe during the pulling-over and lasting operations and are moved inwardly to a position over the shoe for inserting tacks, the driver bars being automatically released by suitable tripping devices not herein shown to permit the spring-actuated levers 238 to operate when the arms reach their innermost position. These lateral movements of the arms 230 are effected by the slide 130 heretofore mentioned as actuated by the shaft 132. Said slide is formed with rack teeth on its opposite edges, as shown in Fig. 18, and the teeth are engaged by segmental rocker arms 241 which also engage slides 242. Each slide has a yielding connection through a spring plunger 243 with a sub-slide 244 which carries a block 245 extending into a vertical guideway in the adjacent arm 230. The sub-slides 244 and the parts to which they are connected are caused to move with the slides 242 by the friction between the slides and the sub-slides and by the engagement of the studs 246 on the spring-pressed plungers 243 with the inclined walls of recesses in the sub-slides.

The lasting mechanism is carried by a support 250 secured to a stud 251 on a bracket attached to the frame and suitably braced by a rod 252. A binding screw 254 extends through an arc-shaped slot 255 and into the frame, thus permitting adjustment of the support about the stud 251. The support 250 is provided in its front face with a guideway extending approximately perpendicular to the plane in which the bottom of the last is located. Mounted in this guideway is a carriage 260 having in its rear face rack teeth which are engaged by a pinion 261 secured to a shaft mounted in the support and provided with a handle 262. A spring 257 counterbalances the weight of the carriage 260 and its attached parts and maintains the carriage normally in its elevated position above the last bottom or on the same side of the last bottom as the sole rest is located. The hand lever 262 provides means by which the lasting means may be moved across the plane of the last bottom from the normal elevated position into position to act on the shoe. Stop screws 266 adjustably limits the upward movement of the carriage. In the carriage 260 is formed a channel having grooved side walls and extending approximately parallel with the plane of the sole rest. The channel receives the side arms or bars of a yoke 263 having its closed end toward the machine and provided with guide slots in which the lasting plates, shown as wipers 264, are mounted. The wipers are joined at their adjacent ends to each other and to the yoke 263 by a connecting plate 265 which is pivotally connected in the construction shown in Figs. 20, 22, and 25 to the yoke by the pin 269. The adjacent faces of the side bars of the yoke are also grooved and movably mounted in them is the rack slide 267 engaged by a pinion 268 on a shaft mounted in the carriage and provided with a hand lever 270. A finger piece 272 on the lever controls a locking device for engaging a toothed plate 274 on the carriage to hold the lever and rack slide in adjusted position. The rack slide is connected to the wipers through an equalizing or centrally pivoted lever 275 and through links 276 extending to the outer rear corners of the wipers. The rack slide also has a yielding connection with the wipers through a spring 278 and the yoke 263. This arrangement for connecting the wipers to the rack slide permits the wipers to have pivotal movement with relation to each other and to the connecting plate 265 for conforming to the contour of the end portion of the shoe to be lasted and also to have pivotal movement laterally to enable them to adapt their position to the position of the toe end of the shoe in the machine. In Fig. 21 the connecting plate is shown as pivoted to a slide 280 which is movable laterally with relation to the rack slide 267, thus permitting a greater bodily lateral movement of the wipers than is provided by the construction shown in Fig. 20. As shown, the slide 280 is mounted in a transverse guideway in the yoke 263. Approximately the same result would be obtained by mounting the slide in or pivoting the connecting plate to the rack slide 267. An adjustable stop 282 is provided on the outer portion of the rack slide 267, as shown in Fig. 23, in position to engage the yoke 263 and limit the distance which the yoke and the wipers 264 are permitted to yield backwardly by the spring 278. The stop may be adjusted to arrest the backward movement of the wipers when they shall have reached the shoulder on the innersole and compel the wipers to press the upper firmly against the base of the shoulder, particularly at the end of the toe. Further movement of the rack slide then forces all the wipers 264, 264 and 265 together lengthwise of the shoe. A lever 285 is pivotally connected to a block 286 arranged to slide in guideways formed in the outer faces of the side bars of the yoke 263, as shown most clearly in Figs. 24 and 25. The lever carries a block 287 adapted to be forced by the lever against the under face of the toe portion of the shoe after the wipers have been moved into position over the shoe bottom, as illustrated in Fig. 25. When the block 287 is not in use the slide 286 will be moved into the dotted line position shown in Fig. 25 and the lever turned into a position, shown also in dotted lines, parallel with the rack bar. The block 286 is shown as provided with a spring-pressed plunger 290 adapted to engage in a recess 292 in the lever for holding the lever in its uplifted position. The block 286 binds in the guideway sufficiently to cause it to retain the position to which it is adjusted. By means of the block 286 the toe of the shoe may be supported while the wipers are pressed downwardly by means of the handle 262, thus pressing or crimping the upper into lasted position and also forming a seat for a binder of wire w or other continuous material which, in welt shoes, will preferably be employed for holding the upper about the end portion of the shoe in lasted position. The upper may be secured in lasted position at the opposite sides of the ball of the shoe by tacks inserted by the tacking mechanism, the forward tack on each side of the shoe serving also as an anchor for the binder.

In the use of the machine an assembled shoe, such as shown, for example, in Fig. 26, is presented by the operator with the sole against the sole rest and the edge of the upper between the open grippers. When the treadle 35 is depressed the brake shoe is lifted and the clutch members are forced together to start the machine. The main shaft 25 is turned until the first rise on the cam 30 depresses the brake shoe and causes the clutch members to be separated. During this partial rotation of the shaft the grippers are closed upon the upper in approximately the position indicated in Fig. 27, this being effected by the movement of the gripper operating levers 72, 72, and 84. The cams 30 and 92, through which the gripper closing and uplifting movements are effected, are so formed relatively that the toe grippers are raised before the side grippers, thus straining the upper lengthwise of the last before it is pulled by the side grippers. The heel rest is also advanced into engagement with the heel end of the last and by reason of its diverging side faces is automatically guided into the lateral position occupied by the heel end of the shoe according to whether the shoe is a "right" or a "left." This advance movement of the heel rest is yieldingly effected through the rack bar 194 and its yielding connection 195 with the slide 178 and cam groove 180, thus providing for an operative engagement of the heel rest with lasts of different lengths. During the last portion of the movement of the slide 178 the heel rest is given a positive forward movement by the lever 200, this movement varying in extent according to the adjustment of the pawl controller 204. The effect of this forward thrust of the last into the upper held under tension by the grippers is to strain the upper slightly backwardly and cause it to set more firmly over the fore part of the last. Simultaneously with the movement of the heel rest the sole rest may be moved longitudinally of the last by the lever 175. The extent and the direction of this movement is determined by the position of the guide block 176. If the sole is unattached to the bottom of the last this movement of the sole rest may be utilized for positioning the sole longitudinally upon the last bottom. If the sole is attached to the last this movement of the sole rest may be utilized in conjunction with the movement of the heel rest for moving the last forwardly with relation to the pulled upper. In addition to this longitudinal movement of the sole rest the rest is moved downwardly by the action of the cam 60 upon the carrier 54 in which the rest is mounted. The downward movement of the last with relation to the grippers, effected by this actuation of the sole rest, sinks or settles the last into the pulled upper.

During the rest in the machine's operation, which occurs after the shaft 25 has stopped upon the completion of the above-mentioned movements, the operator examines the shoe, being enabled to do so readily by reason of the inclination at which the shoe is held in the machine, and determines what, if any, adjustments of the upper with relation to the last are needed for insuring the proper position of the upper upon the last when the shoe is lasted. If the upper is insufficiently stretched on either side of the ball the grippers on that side of the shoe are further uplifted to increase the strain on that side of the upper. If the front seam or lace opening of the shoe is not centrally located on the last the upper may be moved transversely about the last to center this seam or lace opening by moving one side gripper upwardly and the other side gripper downwardly by means of the handles of the levers 72. These manual movements of the side grippers are possible because the levers 72 are connected to their cam 30 by means of the springs 78 which have been compressed during the pulling movement and which permit the levers to be moved in either direction while the upper is held under tension. If the toe tip seam is not straight upon the last but is too far forward or backward at either end the hand lever 164 is actuated to move one side gripper forwardly and the other side gripper rearwardly, thus shifting the upper longitudinally around the last; or the lever 121 may be actuated to shift the toe grippers lengthwise of the edge of the last at the toe, or both the toe grippers and side grippers may be moved for the purpose. If the toe tip seam does not extend in a straight line across the last the toe grippers are manipulated to increase or relax, as may be required, the longitudinal strain effected by it upon the upper. If the toe portion of the upper is not properly pulled to position it over the toe end of the last, the toe grippers may be released by manipulating the finger piece 116 and then moved laterally by the hand lever 121 and reëngaged with the upper at a different point. If desired this may be repeated to pull the upper at a plurality of different points about the toe end of the last to stretch it over the last and work it into proper position.

Under some conditions the sole rest will be manually moved forwardly or backwardly by the hand lever 182, the pawl 174 having been disengaged from the collar 170 by pressure upon finger lever 181. By this movement of the sole rest the last may be thrust farther forwardly into the pulled upper to cause the upper to fit properly about the fore part of the last. In the illustrated machine the sole rest has a plurality of feet 50, Figs. 16 and 20, by which the altitude of the shoe bottom is located with relation to the side clamps 218 and the tackers, and adjustment of the upper is made by moving the grippers relatively to a stationary last or a last held stationary, as by the sole rest. The sole rest also determines the angular plane of the shoe bottom so that there is no necessity for adjusting the wipers angularly about a longitudinal axis to enable them to act uniformly on the two sides of the forepart in wiping the upper inwardly. In various claims are contained elements designated as means for adjusting the upper upon, about or around the last and these claims are to be understood as requiring means capable of effecting adjustment of the upper relatively to a stationary last, as for example a last held from movement during such adjustment by the sole rest feet 50. Such claims are in this respect distinguished from machines in which an adjustment is made by movement of the last. When these manipulations have been completed, or such of them as may be necessary to adjust and fit properly the particular upper upon its last, the treadle is again depressed and the machine started, the driving shaft advancing until the second rise 32 depresses the brake and stops the machine. During this portion of the machine's operation the slide 124 is retracted, permitting the springs 122 to swing the grippers inwardly over the shoe bottom. The slide 222 is also actuated for swinging inwardly the arms 210 to bring the last supports 212 and the clamping devices 218 into operative relation to the shoe. The tack carrying arms 230 at the opposite sides of the shoe may also be moved over the shoe and the tacks driven at this time if desired. In case this is done the side grippers are released from the upper by the engagement of the inwardly swinging arms 230 with the releasing devices 81 on the side grippers. The tack inserting mechanism may, however, not be actuated until the machine is again treadled. While the shoe is held by the supports and the clamping devices the lasting mechanism is actuated to work the upper into lasted position about the toe portion of the shoe. For this purpose the operator lowers the wipers, by manipulating the handle 262, into approximately the plane indicated in dotted lines in Fig. 25. Then by means of the hand lever 270 he advances the wipers toward the shoe. In this advance movement the connecting plate 265 first contacts with the upper and the wipers move laterally according to the contour of the particular shoe being operated upon until they have adapted their position to the position and shape of the shoe. The forward movement of the contacting plate is arrested as soon as it engages the shoe, the yielding connection between said plate and the slide 267 permitting this to occur. In the continued movement of the lever 270 the wipers 264 swing about their pivotal connection with the plate 265 until one or the other of them engages the upper on one side of the shoe. Then the movement of that wiper is arrested while the other wiper continues to close inwardly toward the shoe until it engages its side of the shoe, this relative movement of the wipers being permitted by their connection with the rack slide 267 through the lever 275. When the wipers have thus adjusted themselves bodily according to the position of the toe end of the last and relatively according to the contour of the last by the described movements, which together may produce a curvilinear adjustment, they embrace the entire toe portion of the last and bear with substantially uniform pressure against the upper, this pressure being regulated by the force applied to the hand lever 270. With the wipers in this position, indicated by dotted lines in Fig. 25, the operator manipulates the lever 262 to raise the wipers and cause them to wipe the upper upwardly along the sides of the last toward and over the edge of the last bottom. As the wipers reach the plane of the last bottom they are arrested by the engagement of carriage 260 with the stop 266 which will occupy a predetermined position relatively to the plane of the shoe bottom as controlled by the position at this time of the sole rest such that the wipers will be prevented from rising high enough relatively to the shoe bottom to lose their frictional hold on the upwardly wiped stock before they wipe inwardly. Then the wipers are further closed by the hand lever 270 and caused to advance over the last bottom forcing the upper into lasted position on the innersole, as shown in Fig. 13

25. The upward and inward movements of the wipers for working the upper upwardly and inwardly into lasted position may be repeated as many times as may be required to stretch the upper and conform it to the contour of the last. During this manipulation of the upper into lasted position by means of the wiper the toe grippers may also be employed to engage and pull the upper at any point or points where a local stretching of the upper is required.

The relative position of the parts when the upper has been worked into lasted position may be substantially that indicated in Fig. 20. If the shoe being lasted is a welt shoe, such as indicated in that figure and in Fig. 25, the wipers will force the upper material against the lip or shoulder *s* of the innersole and form a seat for a binder of wire or other continuous material which may be employed for holding the upper in overworked position about the toe portion of the last. For the purpose of crimping and molding the upper into position upon the innersole and against the shoulder or lip the wipers may be pressed downwardly upon the upper by force applied through the hand lever 262. The lever 285 may be employed for supporting the shoe against the downward pressure of the wipers and by applying pressure through both the lever 285 and the lever 262 the shoe will be firmly pressed between the wipers and the rest 286. If the tacks have been driven in the previous treadling of the machine a wire or a strand of other continuous material may be anchored to the forward tack on one side of the shoe and drawn around the toe of the shoe under the wipers, which will be lifted to permit this movement, and then secured to the anchor tack on the other side of the shoe. If the tacks have not already been driven the machine will be treadled to cause the actuation of the tack driving mechanism and then come to rest to permit the binder to be applied. It is obvious that tack driving mechanism might be employed for inserting tacks all around the toe of the shoe if it were desired to secure the upper entirely by tacks. When the upper has been secured the final treadling of the machine will cause the several parts to resume their starting positions, the shoe being released from the machine. In this operation the shoe is pulled over by the preliminary stretching and adjustments of the upper effected by the grippers and then the upper is manipulated into lasted position and secured about the toe portion of the shoe and at opposite sides of the ball of the shoe.

By the expression "pulling-over" as used in the foregoing description and in the claims is meant that operation which was in earlier times performed by hand pullers and which at present is very generally practised by the use of a pulling-over machine of the type shown in United States Letters Patent No. 663,777 and which includes pulling the upper of an assembled shoe into general conformity with the contour of the last and into suitable position thereon with its lines, such as the tip seam and the lace opening, in the desired relation to the last preparatory to lasting the shoe.

Having explained the nature of this invention and described the best embodiment thereof at present known to me, I claim as new and desire to secure by Letters Patent:—

1. A machine to perform successively the operations of pulling-over a shoe and lasting the forepart of the shoe having, in combination, pulling-over means, lasting means, and operating mechanism organized to cause the pulling-over means to seize the upper and stretch it and present the shoe with its sole face in a predetermined plane to receive the operation of the lasting means.

2. A pulling-over and lasting machine having, in combination, toe lasting means, and connected power-operated mechanism organized to pull over a shoe and come to rest holding the shoe with the upper under tension and in position for the action of the lasting means and to release the shoe after said mechanism is restarted.

3. In a machine of the class described, the combination with operating mechanism and means actuated thereby for gripping an upper substantially simultaneously at a plurality of points around the forepart of a last and pulling the upper, of means to rub the pulled upper upwardly along the side faces of the toe portion of the last and then wipe it inwardly to lasted position over the edge and bottom of the last.

4. In a machine of the class described, the combination with means for gripping and pulling an upper substantially simultaneously at a plurality of points, of means for wiping into lasted position the portion of the upper pulled by the grippers while the shoe remains in substantially the same position occupied by it during the pulling-over operation, said pulling means including grippers which are arranged to permit manual manipulation for changing the tension on the pulled upper independently of the pulling operation to assist in the lasting operation.

5. In a pulling-over and lasting machine, the combination with power operated means for gripping an upper and pulling it on a last, said pulling means being arranged for manual movement to manipulate the upper after the power operation of the pulling means, of wipers, and means for actuating the wipers to work into lasted position a continuous section of the pulled upper.

6. In a pulling-over and lasting machine, the combination with last resting means, means for gripping an upper at the end and opposite sides of the forepart of the last, and connected mechanism for operating the gripping means to pull the upper at the points at which it is gripped, of means for adjusting the upper about the last, wipers, and operating means for the wipers by which to rub the upper upwardly on the side faces of the last and wipe it inwardly over the edge and bottom of the last.

7. In a machine of the class described, the combination with power operated means for gripping an upper and pulling it over a last, said means being constructed and arranged to permit movement for adjusting the upper about a stationary last, of means for wiping a continuous section of the upper into lasted position about the toe portion of the last.

8. In a machine of the class described, the combination with power operated means for gripping an upper and pulling it on a last, said means being constructed and arranged to permit movement for adjusting the upper about a stationary last, of manually operated means for wiping a continuous section of the upper into lasted position upon the last.

9. In a pulling-over and lasting machine, the combination with power driven means to pull an upper over a last and automatically come to rest holding it under tension about the forepart of the last, of means for working a continuous section of the upper extending from one side of the forepart of the shoe around the toe to the other side into finally lasted position.

10. In a pulling-over and lasting machine, the combination with grippers arranged for seizing an upper at opposite sides of the forepart of the shoe, said grippers being arranged for movement to adjust the upper relatively to a stationary last, of means for operating the grippers to pull the upper simultaneously at the two sides of the forepart of the last and maintain it under tension, and means for lasting a continuous section of the upper extending from one side of the forepart around the toe to the other side.

11. In a pulling-over and lasting machine, the combination with means for pulling an upper over a last and holding it upon the last, of power driven means for inserting tacks to fasten the upper at opposite sides of the shoe, and means for lasting a continuous section of the toe portion of the shoe.

12. In a pulling-over and lasting machine, the combination with means for pulling an upper over a last and holding it under tension upon the last, of means for working the upper into lasted position, shoe supporting means arranged to be moved into operative position after the upper has been pulled, and power operated means for actuating the supporting means to seize the shoe and to release the shoe after the lasting operation.

13. In a pulling-over and lasting machine, the combination with means for pulling an upper over a last including grippers having means for moving the pulling means in a direction other than that of the pulling strain for movement of the grippers in a direction other than that of the pulling strain for adjusting the pulled upper around a stationary last, of means for working a continuous section of the fore part of the upper into lasted position.

14. In a pulling-over and lasting machine, the combination with power operated means for pulling an upper over a last and holding it under tension upon the last, said means being constructed and arranged for movement for adjusting the upper about a stationary last, of end embracing wipers for forcing a continuous section of the upper into lasted position.

15. In a pulling-over and lasting machine, the combination with means for pulling an upper over a last, of means for adjusting the pulled upper on a stationary last, and means for working a continuous section of the upper into lasted position.

16. In a pulling-over and lasting machine, the combination with means for pulling an upper on a last constructed and arranged for movement to adjust the pulled upper about the last while the last is held stationary, of means for working the upper along the sides and over the edge of the last into lasted position, and means for inserting fastenings in position to hold the upper.

17. In a pulling-over and lasting machine, the combination with means for pulling an upper on a last, of means for adjusting the pulled upper about the last, and means for rubbing the upper upwardly along the sides and inwardly over the edge and bottom of the last to work the upper into lasted position.

18. In a pulling-over and lasting machine, the combination with means for pulling an upper on a last constructed and arranged to hold the last stationary while permitting movement of the pulling means for adjusting the pulled upper about the last, and means for actuating the pulling means for effecting such adjusting movement, of means for lasting a continuous section of the upper.

19. In a pulling-over and lasting machine, the combination with automatic means for pulling an upper on a last, of manually controlled means movable for adjusting the pulled upper about a stationary last, and manually controlled means for working the adjusted upper into lasted position from a point beginning on one side of the shoe and extending around the toe to a point on the other side of the shoe.

20. In a pulling-over and lasting machine, the combination with means for pulling an upper on a stationary last, of means for adjusting the pulled upper about the last, means for forcing the upper over the last bottom and securing it at the sides of the shoe, and means for lasting the toe portion of the shoe.

21. In a pulling-over and lasting machine, the combination with means for pulling an upper over a last, of means for adjusting the pulled upper about a stationary last, power operated means for forcing the upper over the last bottom and securing it at the sides of the shoe while leaving it unsecured at the toe, and other means for thereafter lasting the toe portion of the shoe.

22. In a pulling-over and lasting machine, the combination with means for pulling an upper over a last, of means for operating the pulling means for adjusting the pulled upper about the last, means for working the adjusted upper into lasted position, means for fixing the angular position of the shoe bottom relatively to the plane of action of the overworking means, and means for inserting tacks in position to anchor a binder for holding the overworked upper in lasted position.

23. In a pulling-over and lasting machine, the combination with means for pulling an upper on a last, of means for adjusting the pulled upper about a stationary last, means for lasting the upper over the toe portion of the last, means for forcing the upper over the last bottom at the sides of the last, and means for inserting securing tacks at the sides of the last including tacks positioned for anchoring a binder adapted to hold the toe portion of the upper in lasted position.

24. In a pulling-over and lasting machine, the combination with means for pulling an upper on a last, of means for adjusting the pulled upper longitudinally around a stationary last, and means for working a continuous section of the upper into lasted position.

25. In a pulling-over and lasting machine, the combination with means for pulling an upper on a last. of means for adjusting the pulled upper transversely around a stationary last, and means for working the upper into lasted position.

26. A pulling-over and lasting machine, comprising means for pulling an upper on a last and means for working the upper over the last bottom into lasted position, said machine having means for moving the upper around a stationary last transversely and longitudinally.

27. In a pulling-over and lasting machine, the combination with means for pulling an upper over a last and holding it upon the last, of means for adjusting the upper around the last, means for working the upper into lasted position, shoe supporting means arranged to be moved into operative relation to the shoe after the upper has been adjusted, and means for actuating the supporting means to release the shoe after the lasting operation.

28. In a pulling-over and lasting machine, the combination with means for pulling an upper over a last and holding it upon the last, means for causing a rest in the machine's operations after the upper is pulled, means for adjusting the upper around the last, means for clamping the upper in adjusted position, means for effecting the release of the upper from the pulling means, means for forcing the upper into lasted position, and means for retracting the clamping means.

29. In a pulling-over and lasting machine, the combination with power operated means for pulling an upper over a last and holding it upon the last, of means for adjusting the upper around the last, power operated mechanism for clamping the upper in adjusted position, means for working the upper into lasted position, and power operated means for retracting the clamping means to free the shoe.

30. In a pulling-over and lasting machine, the combination with means for pulling an upper over a last and holding it upon the last, means for adjusting the upper around the last, means for releasing the pulling means from the upper and holding the upper in adjusted relation to the last, and means for working the upper into lasted position.

31. In a pulling-over and lasting machine, the combination with means for pulling an upper over a last and holding it upon the last, said means being constructed and arranged for movement for adjusting the upper around the last, of means for wiping the upper upwardly on the sides of the last and inwardly over the edge and bottom of the last to work it into lasted position, and means for releasing the pulling means and securing the upper.

32. In a pulling-over and lasting machine, the combination with means for pulling an upper over a last and holding it upon the last, of means for adjusting the upper around a stationary last, means for securing the upper at opposite sides of the shoe simultaneously by tacks which are located and left upstanding in position to serve as anchors for a toe binder, and means for lasting a continuous section of the upper extending around the toe portion of the shoe into position to be fastened by a toe binder secured to said anchor tacks.

33. In a pulling-over and lasting machine, the combination with means for pulling an upper to a last constructed and arranged for movement for adjusting the pulled upper around a stationary last, and means for working the fore part of the upper into lasted position, of means for supporting the shoe during the several operations with its bottom face upward in a plane at an oblique angle to the vertical whereby the fore part of the upper is observable to the workman standing at the machine.

34. In a pulling-over and lasting machine, the combination with grippers arranged for gripping an upper on opposite sides of the fore part of a last, and means whereby the positions of the said grippers relatively to one another may be changed to adjust the upper longitudinally about the last, of means for lasting a continuous section of the upper.

35. In a pulling-over and lasting machine, the combination with grippers arranged for gripping an upper on opposite sides of the fore part of a last, and means whereby the positions of the said grippers relative to one another may be changed to adjust the upper about the last, of means for working the upper about the end of the last into lasted position.

36. In a pulling-over and lasting machine, the combination with grippers arranged for gripping an upper on opposite sides of the fore part of a last, and means whereby the positions of the said grippers relatively to one another may be changed to adjust the upper about the last, of means for lasting the upper between the grippers, and means for fastening the upper.

37. In a pulling-over and lasting machine, the combination with grippers arranged for gripping an upper on opposite sides of the fore part of a last, and means whereby the relative positions of the said grippers and last may be changed to adjust the upper about the last, of means for securing the upper in adjusted position, and means for wiping the upper extending around the toe of the last between the said side grippers upwardly on the sides of the last and inwardly over the edge and bottom of the last.

38. In a pulling-over and lasting machine, the combination with grippers arranged to engage an upper at opposite sides of a last, and power driven mechanism for relatively moving the grippers and last to strain the upper, of means for thereafter actuating the grippers manually to adjust the upper about the last, and means for working a continuous section of the upper into lasted position.

39. In a pulling-over and lasting machine, the combination with grippers arranged to engage an upper at opposite sides of a last, and connected operating mechanism for relatively moving the last and the opposite side grippers to strain the upper, of means for thereafter actuating the grippers to adjust the upper about the last, means for holding the pulled upper in adjusted position, and means for lasting the upper.

40. In a pulling-over and lasting machine, the combination with power driven operating means for pulling an upper on a last, said means being arranged for manual movement to adjust the fore part of the upper around the last, of means for lasting said fore part of the upper.

41. In a pulling-over and lasting machine, the combination with power driven operating means for pulling an upper on a last, said means being arranged for manual movement to adjust the fore part of the upper around the last, of means for fastening the upper in adjusted position, and means for lasting said fore part of the upper.

42. In a machine for pulling-over and lasting shoes, the combination with a sole rest, grippers for engaging the upper at the sides and the toe of the last, and power driven means for relatively actuating the grippers and last to pull the upper to the last, of means by which the toe gripper may be independently actuated to release the upper, means for actuating the side grippers to adjust the upper around the last, and means for lasting the toe portion of the shoe.

43. In a machine for pulling-over and lasting shoes, the combination with a sole rest, grippers for engaging the upper at the sides and the toe of the last, and automatically operating means for relatively actuating the grippers and last to pull the upper to the last, of means by which the toe gripper may be independently actuated to pull the toe portion of the upper, and means for lasting the toe portion of the shoe.

44. In a machine for pulling-over and lasting shoes, the combination with a sole rest, grippers for engaging the upper at the opposite sides and at the toe of the last, and automatically operating means for relatively actuating the grippers and last to pull the upper to the last, of means by which the toe gripper may be independently actuated to strain the upper longitudinally of the last, and means for wiping the upper upwardly on the side faces of the last and inwardly over the edge and bottom of the last into lasted position.

45. In a machine of the class described, the combination with power operated means for pulling an upper over a last, said means being constructed and arranged for manual operation for further pulling the upper, of end embracing wipers, and means for actuating the wipers to work the pulled upper into fully permanently lasted position about the toe end of the last.

46. In a machine of the class described, the combination with power operated grippers for engaging an upper at a plurality of points to pull the upper over the last, said grippers being arranged for separate manual operation to adjust the upper about the last, of other means for working the upper over the last bottom into lasted position about the toe end of the last.

47. In a machine of the class described, the combination with grippers for pulling an upper over a last, and power operated mechanism for causing the grippers to pull the upper first longitudinally of the last and then transversely of the last, of means for then forcing the upper into lasted position about the toe end of the last.

48. In a machine of the class described, the combination with grippers for engaging an upper at the toe and the opposite sides of a last and power operated means for actuating the toe gripper to straighten the upper longitudinally and then actuating the side grippers to pull the upper, of means for working the upper upwardly along the side surfaces of the last and inwardly over the edge and bottom of the last.

49. In a machine of the class described, the combination with relatively movable grippers for engaging an upper at a plurality of points, a rest for engaging the bottom of the last, and means for actuating the rest to sink the last into the upper, of means for working the upper into lasted position about the toe end of the last, said machine being constructed and arranged to permit movement of the grippers relatively to one another and to a stationary last to adjust the upper upon the last.

50. In a machine of the class described, the combination with grippers for engaging an upper at a plurality of points, a rest for engaging the bottom of the last, and means for actuating the rest to sink the last into the upper, wipers, of manually controlled means for moving the grippers to adjust the upper upon the last and mechanism for actuating the wipers to work the upper upwardly along the sides of the last and inwardly over the edge and bottom of the last.

51. In a machine of the class described, the combination with grippers for engaging an upper at a plurality of points, a rest for engaging the bottom of the last, power driven mechanism for moving the grippers to pull the upper, and means for actuating the rest to sink the last into the pulled upper including means for giving the last an endwise movement in the upper, of means for working the upper into lasted position.

52. In a pulling-over and lasting machine, the combination with a rest for the sole of a last, grippers, and power operated mechanism for actuating the grippers to pull the upper to the last, supporting means automatically movable into position for sustaining the shoe after the upper has been pulled, and means for working the pulled upper into lasted position.

53. In a pulling-over and lasting machine, the combination with a rest for the sole of a last, and power operated means for pulling the upper over the last, said means being constructed and arranged for movement to adjust the upper around the last, of power operated means for inserting fastenings to secure the upper in adjusted position, means for lasting the toe portion of the upper, and means constructed and arranged to be automatically actuated to support the shoe during the fastening inserting and lasting operations.

54. In a machine of the class described, the combination with means for pulling an upper over a last, and means for working the upper into lasted position, of supporting means occupying a position out of touch with the shoe during the pulling operation, and power operated mechanism for actuating the supporting means into position to support the shoe after the upper has been pulled.

55. In a machine of the class described, the combination with means for pulling over the upper and means for lasting the upper, of shoe supporting means occupying an inoperative position during the operation of the pulling-over means and movable from opposite sides of the shoe into position to seize and hold the shoe during the operation of the lasting means.

56. In a machine of the class described, the combination with power operated means for pulling over the upper and means for lasting the upper, of shoe supporting means comprising devices for engaging the shoe at opposite sides and automatically actuated from and toward the shoe laterally to occupy an ineffective position during the operation of the pulling-over means and to occupy a position for supporting the shoe during the operation of the lasting means.

57. In a machine of the class described, the combination with means for pulling an upper about the sides of a last and means operating during the pulling movement for changing the relative positions of the last and pulling means for causing the upper to be strained backwardly along the sides of the last, of lasting plates for forcing the upper of the forepart of the shoe inwardly from the sides and backwardly from the toe end over the last bottom into lasted position.

58. In a machine of the class described, the combination with means for pulling an upper about the sides of a last and means for changing the relative positions of the last and pulling means for causing the upper to be strained backwardly and upwardly along the sides of the last, of lasting plates arranged to be operated to work the upper forwardly and upwardly along the sides of the toe portion of the last and then inwardly over the edge of the last bottom.

59. In a pulling-over and lasting machine, the combination with grippers and power operated means for actuating the grippers to pull an upper on a last, and means for thereafter causing a rest in the machine's operation, of means for adjusting the upper about the last, means for forcing the upper into lasted position, and means for automatically opening the grippers to release the upper when the machine is restarted.

60. In a machine of the class described, the combination with means for supporting a last, of grippers for engaging the upper at the toe of the last, grippers for engaging the upper at the side of the last, and devices for moving both the toe grippers and the side grippers lengthwise of that portion of the edge of the last adjacent to which the respective grippers are located.

61. In a machine of the class described, the combination with power operated means for pulling an upper on a last, and supports for the shoe moved automatically into operative position after the upper has been pulled, of means for causing a rest in the machine's operations, means for forcing the pulled upper into lasted position, and means for moving the supports to release the shoe when the machine is restarted.

62. In a machine of the class described, the combination with power operated means for pulling an upper on a last, means for causing a rest in the machine's operation, and means for adjusting the upper about the last, of supports for the shoe moved automatically into operative position when the machine is restarted, means for causing a second rest in the machine's operation, means for working the upper into lasted position, and means for moving the supports to release the shoe when the machine is again started.

63. In a machine of the class described, the combination with power operated means for pulling an upper on a last, means for causing a rest in the machine's operation, means for adjusting the upper about the last, supports for the shoe moved automatically into operative position when the machine is restarted, means for driving tacks to fasten the upper in adjusted position, means for causing a second rest in the machine's operation, means for working the upper into lasted position, and means for moving the supports to release the shoe when the machine is again started.

64. In a machine of the class described, the combination with means for pulling an upper over a last having an innersole on the bottom face, means for causing a rest in the machine's operations after the upper is pulled, means for forcing the upper into lasted position over the margin of the innersole, and power operated means for fastening the upper to the innersole when the machine is restarted.

65. In a pulling-over and lasting machine, the combination with means for pulling an upper on a last having an innersole on the bottom face, means for causing a rest in the machine's operations after the upper is pulled, means for adjusting the upper about the last, other means for forcing the upper into lasted position over the margin of the innersole, and power operated means for fastening the upper to the innersole when the machine is restarted.

66. In a machine for working an upper over a last, the combination with power operated means for gripping an upper, and means for causing a rest in the machine's operations, of means for working the upper into lasted position, and means for automatically inserting fastenings when the machine is restarted.

67. In a machine for working an upper over a last, the combination with power operated means for gripping an upper, and means for causing a rest in the machine's operations, of means for moving the grippers to adjust the upper about the last, means for working the upper into lasted position, and means for automatically releasing the grippers and inserting fastenings when the machine is started.

68. In a pulling-over and lasting machine, the combination with mechanism for pulling-over an upper loosely arranged upon a last, said mechanism being constructed and arranged to hold the last stationary while moving the pulling means for correctly adjusting the pulled upper upon said last, of lasting mechanism for working the upper into lasted position after the operation of said pulling-over means and while the shoe remains in substantially the same position.

69. In a pulling-over and lasting machine, the combination with power driven mechanism for pulling-over an upper loosely arranged upon a last, said mechanism being constructed to permit manual adjustment for positioning the pulled upper upon a stationary last, of lasting mechanism for working the upper into lasted position after the operation of said pulling means and while the shoe remains in substantially the same position.

70. In a pulling-over and lasting machine, the combination with means for gripping the fore part of an upper loosely arranged upon a last and mechanism for actuating the gripping means to pull the upper on the last, of means for adjusting the upper about the last and mechanism for working a continuous section of the upper into lasted position while the shoe remains in the position occupied by it at the end of the pulling over operation.

71. In a pulling-over and lasting machine, the combination with a rest for a last and means for gripping an upper and pulling it about the last, of means for relatively actuating the gripping means and the rest to strain the upper upwardly and backwardly along the sides of the last, and lasting mechanism constructed and arranged to work the toe portion of the upper upwardly and forwardly along the side face of the last and into lasted position on the bottom of the last.

72. In a pulling-over and lasting machine, the combination with a rest for a last, means for gripping an upper, and operating means to cause the gripping means to pull the upper about the last, of additional means for actuating the rest to sink the last into the pulled upper in a direction to cause the upper to be strained backwardly along the sides of the last, and means for forcing the upper into lasted position about the toe end of the last.

73. In a machine of the class described, the combination with means for supporting a last, of grippers for engaging the upper at the toe of the last, grippers for engaging the upper at the side of the last, and means for independently moving the side grippers lengthwise of the last and the toe grippers laterally of the last.

74. In a machine of the class described, the combination with power operated means for pulling an upper simultaneously at opposite sides of a last, of means connected with said operating means for moving the last and the pulling means relatively during the upper pulling movement to strain the upper lengthwise of the last, and means for forcing the upper into lasted position, all arranged to operate while the shoe remains in substantially the same position.

75. In a machine of the class described, the combination with means for pulling an upper simultaneously at opposite sides of a last, of means for moving the last and the pulling means relatively for rearwardly straining the sides of the upper lengthwise of the adjacent edges of the last, and means for working the toe portion of the upper forwardly and upwardly toward and over the edge of the last and into lasted position.

76. In a machine of the class described, the combination with means for engaging an upper at opposite sides of the ball of a last, means for sinking the last into the upper and for actuating the last forwardly therein whereby the sides of the upper are strained rearwardly from the ball of the last, and means for working the toe portion of the last forwardly and upwardly into lasted position about the toe portion of the last.

77. In a machine of the class described, the combination with means for engaging an upper at opposite sides of the ball of a last, means for sinking the last into the upper and for actuating the last forwardly therein whereby the sides of the upper are strained rearwardly from the ball of the last, means for fastening the upper at opposite sides of the ball of the last, and means for working the toe portion of the last forwardly and upwardly into lasted position about the toe portion of the last.

78. In a machine of the class described, the combination with means for gripping an upper at opposite sides of a last and pulling the upper, of a rest for engaging an innersole on the bottom of the last, means for moving the rest forwardly with relation to the pulling means, and lasting mechanism for working the upper into lasted position about the toe portion of the last.

79. A machine of the class described having means for positioning a last, comprising a rest for the bottom of the last and a heel rest supported for automatic movement laterally to render it self-adapting to heels of differently shaped lasts, combined with means for pulling an upper on the last, and means for forcing the upper into lasted position, said lasting means being mounted to receive in substantially the same lateral position the foreparts of differently shaped lasts.

80. A pulling-over and lasting machine having means for positioning a stationary last, comprising a rest for the bottom of the last and a heel rest laterally movable to engage heels of differently shaped lasts, combined with means for pulling an upper on the last constructed and arranged for movement to adjust the upper about the last, means for forcing the upper into lasted position about the toe of the last, and tack driving mechanism.

81. A machine of the class described, having means for pulling-over a shoe and means for working the shoe upper into lasted position, combined with a rest for the heel of the last, said machine having provision for movement of the rest automatically into position to support the shoe.

82. In a machine of the class described, means for pulling-over a shoe and means for working the shoe upper upwardly along the side of the last and inwardly and backwardly over the edge of the last, combined with a rest for the heel of the last, and automatically operating means for actuating the rest into position to support the shoe against rearward displacement by the means acting on the upper.

83. In a machine of the class described, means for pulling over a shoe, and means for working the shoe upper into lasted position, combined with a rest for the heel of the last and yielding actuating mechanism for moving the heel rest into engagement with the last.

84. In a machine of the class described, means for gripping an upper and pulling it on a last, and means for working the upper into lasted position, combined with a laterally movable rest for the heel of the last, and means acting without attention from the operator for locking the heel rest against displacement during the operation of the means acting on the upper.

85. In a machine of the class described, means for gripping an upper and pulling it on a last, and lasting means constructed and arranged to act upon the shoe while it remains in substantially the position occupied by it during the pulling operation and to adapt itself to the shape of the fore part of the last, combined with a heel rest laterally movable according to the position of the heel of the last.

86. In a machine of the class described, means occupying a constant position for right and left shoes and adapted to grip the upper at the sides of the last and pull the upper, and wiper plates movable relatively to said means according to the shape of the fore part of the last and arranged to operate on the shoe in substantially the position occupied by it during the pulling operation, combined with a heel rest bodily movable laterally into different positions for engaging the heel ends of right and left lasts.

87. In a machine of the class described, lasting means comprising wipers relatively movable to adapt their acting edges to the reverse shapes of the foreparts of right and left lasts, combined with a heel rest mounted for automatic bodily movement laterally according to the position of the heel end of the last for supporting the last at the heel.

88. In a machine for the class described, the combination with wipers constructed and arranged to embrace the toe portion of a shoe and work the upper over the last, of a rest for the heel of the last, and automatically operating means for actuating the rest to move the last forwardly independently of the actuation of the wipers.

89. In a machine of the class described, the combination with wipers constructed and arranged to embrace the toe portion of a shoe and work the upper over the last, of a rest for the heel of the last, and yielding means for moving the heel rest into engagement with the shoe, and positively operated means acting automatically to move the rest for advancing the last toward the wipers while the wipers are at rest.

90. In a machine of the class described, the combination with means for pulling over a shoe and wipers constructed and arranged to embrace the toe portion of shoe and work the upper over the last, of a rest for the heel of the last, and power operated means for actuating the rest to move the last forwardly while the upper is under tension applied by the pulling-over means.

91. In a machine of the class described, the combination with a rest for the bottom of a last and lasting means for working the upper over the toe portion of the last, of means for actuating the bottom rest lengthwise of the last.

92. In a machine of the class described, the combination with power operated means to pull over the shoe, comprising means for engaging the upper at opposite sides of the last, said engaging means being constructed and arranged for relative adjustment to position the pulled upper upon the last, of means constructed to wipe the upper into lasted position over the toe portion of the last while the last remains in substantially the position occupied by it during the pulling-over operation.

93. In a machine of the class described, the combination with means for engaging an upper at opposite sides of a last and pulling it over a stationary last, and means for engaging the upper at the toe of the last and pulling it, of means for adjusting the pulled upper about the last, and other means constructed and arranged to work the upper into lasted position over the toe portion of the last while the last remains in substantially the position occupied by it during the pulling operation.

94. In a machine of the class described, the combination with means for engaging an upper at opposite sides of a last and pulling it over the last, means for inserting tacks at the sides of the shoe to secure the upper in pulled-over position, and means for engaging and pulling the toe portion of the upper, of means constructed and arranged to embrace the toe portion of the shoe and wipe the upper upwardly along the side face of the last and then inwardly over the edge and bottom of the last.

95. In a machine of the class described, the combination with meads for supporting a shoe with its bottom face upward in a plane at an oblique angle to the vertical, said means being constructed and arranged to permit a substantially unobstructed view of the upper of the fore part of the shoe by a workman standing at the machine, and means for engaging the upper at opposite sides of the last and at the toe of the last and pulling it, of means for adjusting the pulled upper about a stationary last, and lasting means for working the upper over the toe portion of the last.

96. In a machine of the class described, the combination with means for supporting a shoe with its bottom face upward in a plane at an oblique angle to the vertical, said means being constructed and arranged to permit a substantially unobstructed view of the upper of the fore part of the shoe by a workman standing at the machine, and means for engaging the upper at opposite sides of the last and at the toe of the last and pulling it, said pulling means having provision for relative adjustment of the pulling means and the last for shifting the upper about the last, of means movable perpendicularly to the last bottom and also parallel therewith for embracing the toe portion of the shoe and wiping the upper upwardly and then inwardly over the edge of the last bottom.

97. In a machine of the class described, the combination with means for pulling-over a shoe, which means is arranged for manipulation to produce adjustment of the shoe upper upon a last while the last is maintained stationary in the machine, of a shoe supporting means constructed and arranged to sustain the shoe for a toe lasting operation while allowing an unobstructed view of the upper on the toe portion of the last, and means for working the upper into lasted position about the toe portion of the last while the last remains in substantially the position occupied by it during the pulling-over operation.

98. In a machine of the class described, the combination with means for engaging and pulling an upper at opposite sides of a last, of means arranged to effect relative movement of the pulling means in directions for adjusting the upper about the last while the upper is held under tension, and means for engaging the upper at the end and corners of the toe portion of the shoe to work the upper into lasted position about the toe of the last.

99. In a machine of the class described, the combination with pulling-over means constructed and arranged for movement to adjust the upper upon a stationary last, of means for working a continuous section of the upper extending around the toe into lasted position, and tack driving means.

100. In a machine of the class described, the combination with power operated pulling-over means, of manually actuated means for working a continuous section of the upper extending around the toe into lasted position, and power operated tacking means.

101. In a machine of the class described, the combination with pulling-over means, of means constructed and arranged to last a continuous section of the toe portion of the upper, and power operated tacking means.

102. In a machine of the class described, the combination with pulling-over means, of means for lasting a continuous section of the upper extending around the toe, and power operated mechanism constructed and arranged to insert at opposite sides of the shoe tacks adapted to anchor a binder for holding the upper in lasted position about the toe portion of the shoe.

103. In a machine of the class described, the combination with means for pulling-over a shoe, comprising a gripper for engaging the upper at the toe of the last and operating means for straining the upper between the gripper and the last, of wipers and means for supporting and operating the wipers for rubbing the upper upwardly along the side face of the last and inwardly over the edge of the last into lasted position about the toe of the shoe.

104. In a machine of the class described, the combination with means for pulling over a shoe, comprising a gripper for engaging the upper at the toe of the last and power operated means for straining the upper between the gripper and the last, of means for working the upper into lasted position simultaneously at the end and the corners of the toe of the shoe.

105. In a machine of the class described, the combination with means for pulling-over a shoe, occupying a predetermined position in the machine and comprising a gripper arranged to engage the upper at the toe of the last and power operated means for straining the upper between the gripper and the last, of means for working a continuous section of the toe portion of the upper into lasted position.

106. In a machine of the class described, the combination with means for pulling-over a shoe, comprising a gripper for engaging the upper at the toe of the last and actuating means for straining the upper between the gripper and the last, and means for adjusting the upper upon a stationary last, of means for lasting the forward portion of the shoe.

107. In a machine of the class described, the combination with means for pulling-over a shoe, comprising a gripper for engaging the upper at the toe of the last and power operated actuating means for straining the upper between the gripper and the last, of connected, relatively movable lasting devices arranged to embrace the toe portion of the last and to be actuated for forcing the upper thereon inwardly toward lasted position on the last bottom while the shoe remains in substantially the position occupied by it during the pulling-over operation.

108. In a machine of the class described, the combination with power operated means for pulling-over a shoe, comprising a gripper for engaging the upper at the toe of the last and actuating means for straining the upper between the gripper and the last, of relatively movable wiper plates constructed and arranged to adjust themselves automatically to the shape of the toe portion of the last, and means for actuating said plates to work the upper into lasted position while the shoe remains in substantially the position occupied by it during the pulling-over operation.

109. In a machine of the class described, the combination with a gripper arranged to engage the toe portion of an upper on a last, and power operated means for actuating it to grip the upper, said machine being constructed and arranged to permit manual operation of the gripper to pull the upper, of means for working the upper into lasted position at the end and the corners of the toe of the last.

110. In a machine of the class described, the combination with a gripper arranged to engage the toe portion of an upper on a last, and power operated means for actuating the gripper to grip and pull the upper, said machine being constructed and arranged to permit manual operation of the gripper for further manipulating the upper, of lasting means arranged to be actuated by the operator for working the upper upwardly along the side face of the last and inwardly over the edge and bottom of the last.

111. In a machine of the class described, the combination with lasting wipers for working an upper backwardly over the toe portion of a last, of means for engaging an innersole on the last bottom, and automatically operating mechanism for actuating said engaging means in the direction to press the innersole forwardly toward the toe end of the last.

112. In a machine for working an upper over a last, the combination with grippers and power operated means for actuating the grippers to grip and pull the upper, of means for thereafter causing a rest in the machine's operations, means arranged to be actuated independently of the machine's regular operation for working the upper toward lasted position, and means for automatically opening the grippers when the machine is restarted.

113. In a machine of the class described, the combination with means for pulling an upper on a last, comprising a gripper for engaging the upper at the toe of the last and power operating means for straining the upper between the gripper and the last, of means for working the toe portion of the upper into lasted position, said gripper being constructed and arranged to permit it to be manually actuated for further straining the upper during the operation of said last-mentioned means.

114. In a machine for working an upper over a last, the combination with grippers and power operated means for actuating the grippers to grip and pull the upper, of means for thereafter causing a rest in the machine's operations, manually actuated means for working the upper upwardly along the side of the last and inwardly over the edge of the last, and means for opening the grippers.

115. In a machine of the class described, the combination with means for pulling an upper on a last, comprising a gripper for engaging the upper at the toe of the last and power operated means for straining the upper between the gripper and the last, of means for working the toe portion of the upper into lasted position, said gripper being constructed and arranged to be manipulated for relaxing or increasing the strain on the upper engaged by it during the operation of the last-mentioned means.

116. In a machine of the class described, the combination with means for pulling an upper on a last, comprising a gripper for engaging the upper at the toe of the last and power operated means for straining the upper between the gripper and the last, of means for working the toe portion of the upper into lasted position, said gripper being constructed and arranged to be manipulated for disengaging the upper and reengaging it at different points during the operation of the last-mentioned means.

117. In a machine of the class described, the combination with means for pulling an upper on a last, comprising a gripper for engaging the upper at the toe of the last and power operated means for straining the upper between the gripper and the last, of means for working the toe portion of the upper into lasted position, said gripper being constructed and arranged to be manipulated for disengaging the upper, shifting laterally, and reëngaging and pulling the upper at a different point during the operation of the last-mentioned means.

118. A machine for pulling over a shoe and giving final lasted form to the toe portion of the shoe having, in combination, pulling over means, means for lasting a continuous section of the upper extending from one side of the forepart around the toe end to the other side, and a rest between which and the shoe there is automatic movement into supporting engagement for the heel end of the shoe after the pulling over means has begun to stretch the upper and in time to resist the backward thrust of the forepart lasting means.

119. A machine of the class described having, in combination, pulling-over means, toe lasting means operating to force over the last bottom a continuous section of upper extending from one side around the toe to the other side, and heel resting means movable automatically from an inoperative to an operative position and self-adapting to the heel ends of right and left crooked lasts the foreparts of which are positioned similarly relatively to the lasting means.

120. In a machine of the class described, the combination with means for supporting a last, of grippers and power operated means for actuating the grippers to grip and pull the upper, and manually operated means for moving the grippers laterally of the last.

121. In a machine of the class described, the combination with means for supporting a last, of grippers and power operated means for actuating the grippers to grip and pull the upper lengthwise of the shoe, means for causing a rest in the machine's operation while the grippers hold the upper, and manually controlled means for moving the grippers laterally to vary the direction of the strain upon the upper.

122. In a machine of the class described, the combination with means for supporting a last, of toe grippers and power operated means for actuating the grippers to grip and pull the upper, means for causing a rest in the machine's operation while the grippers hold the upper, manually controlled means for opening the grippers and re-engaging them with the upper, and means for moving the grippers laterally.

123. In a machine of the class described, the combination with means for supporting a last, of grippers for engaging the upper at the toe of the last, and a guide for holding the grippers normally in central position and constructed and arranged to permit the grippers to be moved laterally of the last.

124. In a machine of the class described, the combination with means for supporting a last, of grippers for engaging the upper at the toe of the last, a guide for the grippers, and a manually actuated cam for moving the guide to shift the grippers laterally of the last.

125. A pulling over machine of the class described having, in combination, forepart resting means for a shoe, means to fix the shoe in position against said forepart resting means, forepart lasting means constructed and arranged for working into finally lasted position a continuous section of upper extending from one side of the shoe around the end of the toe to the other side, and power operated heel resting means movable laterally of the shoe for supporting the differently positioned rear parts of shoes on right and left crooked lasts the foreparts of which are similarly positioned relatively to the lasting means.

126. A machine of the class described, having grippers positioned to engage an upper at opposite sides of the shoe, and a gripper positioned to engage the upper at the toe of the shoe and arranged for movement laterally of the shoe, combined with means for relatively actuating the grippers and the last to strain the upper, and means for actuating the toe gripper laterally of the shoe.

127. In a machine of the class described, the combination with wipers and means for actuating the wipers to work an upper into lasted position about the toe portion of a last, of a presser and a swinging carrier therefor, said presser and carrier being constructed and arranged to occupy during the overworking operation of the wipers a position to permit an unobstructed view of the forepart of the upper by the workman, and means for actuating the presser to engage the forepart of the shoe and force it against the wipers.

128. In a machine of the class described, the combination with wipers and means for actuating the wipers to work an upper into lasted position about the toe portion of a last, of a presser movably mounted under the wipers to occupy during the operation of the wipers a position out of contact with the shoe, and means for moving the presser lengthwise of the shoe into operative relation thereto and to actuate the presser for clamping the shoe against the wiper.

129. In a machine of the class described, the combination with wipers and means for actuating the wipers to work an upper into lasted position about the toe portion of a last, of a presser, a slide on which the presser is pivotally mounted for movement from an inoperative position in advance of the shoe to a position under the shoe, and means to actuate the presser to clamp the shoe against the wipers.

130. In a machine of the class described, the combination with wipers and means for actuating the wipers to work an upper into lasted position about the toe portion of a last, of a presser, a slide movable lengthwise of the shoe, and a lever pivoted to the slide and supporting the presser, said machine being constructed and arranged for manipulation of the lever to position and actuate the presser.

131. In a machine of the class described, the combination with wipers and means for actuating the wipers to work an upper into lasted position about the toe portion of a last, of a presser, a slide movable lengthwise of the shoe, a lever pivoted to the slide and supporting the presser, and means for securing the presser normally in an inoperative position.

132. In a machine of the class described, the combination with means for working an upper over a last, of means for supporting the last with its bottom face upward in a plane at an oblique angle to the vertical, and a presser manually movable into engagement with the fore part of the upper after the overworking operation, said parts being constructed and arranged to permit the operator to have a substantially unobstructed view of the forward portion of the shoe during the overworking operation.

133. In a machine of the class described, the combination with a rest for a last and grippers for pulling the toe portion of the upper, of end-lasting mechanism arranged to act on the shoe while it is in the pulling position, and means for supporting the end lasting mechanism for movement substantially perpendicular to the plane of the shoe bottom toward and from lasting position, said machine having means for sustaining said mechanism in an inoperative position which will permit the workman to have during the pulling operation a substantially unobstructed view of the upper on the last.

134. In a machine of the class described, the combination with a rest for a last and grippers for pulling the upper on the last, of end lasting mechanism, and means for supporting the end lasting mechanism for movement substantially perpendicular to the plane of the shoe bottom, said machine having means for sustaining said mechanism on the same side of the plane of the last bottom as that occupied by the grippers during the pulling operation whereby an unobstructed view of the stretched upper may be had by the workman.

135. In a machine of the class described, the combination with a rest for a last and grippers for pulling the upper on the last, of end lasting mechanism, a guide extending substantially perpendicularly to the plane of the last bottom and relatively to which the lasting mechanism is movable toward and from operative position, and means for sustaining said mechanism normally at the opposite side of the said plane from that occupied by the shoe.

136. In a pulling-over and lasting machine, the combination with a rest for a last and means for pulling an upper on the last, of lasting mechanism normally occupying an inoperative position above the plane of the last bottom and movable across said plane into operative position.

137. In a pulling-over and lasting machine, the combination with pulling-over mechanism and lasting mechanism including wipers having an upper rubbing movement first across and then parallel with the plane of the last bottom and constructed and arranged to operate upon a shoe remaining in approximately the same position in the machine, of supporting and guiding means for the lasting mechanism arranged to permit the lasting mechanism to occupy during the operation of the pulling-over mechanism a position on the same side of the plane of the last bottom as the innersole to permit an unobstructed view of the shoe upper by the workman.

138. In a machine of the class described, the combination with a rest for the bottom of a last, of lasting mechanism constructed and arranged to occupy normally a position on the same side of the plane of the last bottom as the rest, and means for moving the said mechanism across said plane while the last occupies substantially a single portion and means for actuating said mechanism to work an upper into lasted position upon the last.

139. In a machine of the class described, the combination with a frame and a rest for a shoe, of a guide attached to the frame for angular adjustment relatively to the plane of the bottom of a shoe held against the rest, a carrier, and means for moving it in the guide in a direction substantially perpendicular to the plane of the shoe bottom, a carriage, and means for moving the carriage in a plane substantially parallel with the plane of the shoe bottom, and lasting plates operatively connected to the carriage.

140. In a machine of the class described, end lasting mechanism comprising an actuator, a plate yieldingly mounted with relation to the actuator, wipers pivotally connected at their adjacent ends to the plate, and connections independent of the plate between the outer ends of the wipers and the actuator.

141. In a machine of the class described, end lasting mechanism comprising an actuator, a member yieldingly connected with the actuator and adapted to engage the central portion of the end of a shoe, and wipers operatively connected with the said member for movement relatively thereto to engage the upper at the corners of the end of the shoe for turning the upper over the shoe bottom.

142. In a machine of the class described, end lasting mechanism comprising an actuator, a plate yieldingly mounted with relation to the actuator, wipers pivotally connected at their adjacent ends to opposite edges of the plate and unyielding connections between the actuator and the outer ends of the wipers.

143. In a machine of the class described, end lasting mechanism comprising an actuator, wipers having a pivotal yielding connection at their inner adjacent ends with the actuator, and an unyielding connection at their outer ends with the actuator.

144. In a machine of the class described, mechanism comprising an actuator, a slide arranged to move freely transversely of the actuator and to yield lengthwise of the actuator, wipers having a pivotal connection at their inner ends with the slide, and an unyielding connection at their outer ends with the actuator.

145. In a machine of the class described, end lasting mechanism comprising an actuator, wipers for forcing the upper over the last bottom at the corners of the last, a yielding connection between the actuator and the inner ends of the wipers, and an unyielding connection between the actuator and the outer ends of the wipers.

146. In a machine of the class described, end lasting mechanism comprising relatively movable wipers, an actuator, and connections between the inner adjacent ends of the wipers and the actuator and between the outer ends of the wipers and the actuator constructed and arranged to permit bodily lateral movement of the wipers to conform to the position of the last.

147. In a machine of the class described, end lasting mechanism comprising relatively movable wipers, an actuator, a yielding connection between the inner adjacent ends of the wipers and the actuator and relatively movable connections between the outer ends of the wipers and the actuator, said connections being constructed and arranged to permit the wipers to conform to the shape and position of the end portion of the last.

148. In a machine of the class described, end lasting mechanism comprising an actuator, a central wiper plate yieldingly mounted with relation to the actuator and side wipers separately pivoted at their inner adjacent ends to the central wiper plate and pivotally connected at their outer ends with the actuator.

149. In a machine of the class described, end lasting mechanism comprising an actuator, wipers having a pivotal yielding connection at their inner adjacent ends with the actuator, and an unyielding connection at their outer ends with the actuator, said mechanism having provision for bodily movement of the wipers transversely of the direction of movement of the actuator.

150. In a machine of the class described, end lasting mechanism comprising relatively movable end wipers for working an upper over the end of a last, and means for actuating the wipers, said mechanism having provision for bodily sliding movement of the wipers together transversely of the last.

151. In a machine of the class described, end lasting mechanism comprising relatively movable end wipers for working an upper over the end of a last, and means for actuating the wipers, said parts being constructed and arranged to permit bodily lateral curvilinear adjustment of the wipers together about a center located in advance of the acting edges of the wipers.

152. In a machine of the class described, end lasting mechanism comprising relatively movable wipers for working an upper over the end of a last, an actuator, a pivotal connection between the wipers and the actuator located back of the acting edges of the wipers, and an equalizing lever fulcrumed on said actuator and connections between the lever and the outer ends of the wipers.

153. In a machine of the class described, end lasting mechanism comprising relatively movable wipers for working an upper over the end of a last, an actuator, a plate having a yielding pivotal connection with the actuator, and pivotal connections with the inner adjacent ends of the wipers, and other connections, including an equalizer, between the outer ends of the wipers and the actuator.

154. In a machine of the class described, lasting mechanism comprising an actuator, wipers yieldingly connected pivotally at their inner adjacent ends to the actuator, and an equalizing device through which the wipers are connected at their outer ends with the actuator.

155. In a machine of the class described, lasting mechanism comprising an actuator, wipers yieldingly connected at their inner adjacent ends to the actuator, means through which the wipers are connected at their outer ends with the actuator to close them, and means by which the wipers are given a positive movement lengthwise over the shoe after they have been closed.

156. In a machine of the class described, lasting mechanism comprising an actuator, a slide movable transversely of the actuator, wipers connected at their inner adjacent ends with the slide, a yielding element between said inner ends of the wipers and the actuator, and an equalizing device through which the wipers are connected at their outer ends to the actuator.

157. In a machine of the class described, lasting mechanism comprising an actuator, wipers connected at their inner adjacent ends to the front corners of a triangular plate the rear corner of which is pivotally connected to the actuator, and an equalizer through which the wipers are connected at their outer ends to the actuator.

158. In a lasting machine, means for holding and clamping a last and upper in position to be lasted, means for lasting the upper, and power operating mechanism for the aforesaid parts, including means for automatically stopping the machine between the clamping operation and lasting operation, and means for automatically stopping the machine between the lasting operation and the releasing of the lasted shoe.

159. A pulling-over and lasting machine, having, in combination, means for pulling-over a shoe, power operated means for forcing the upper over the last bottom and securing it at the sides of the shoe, and other means for lasting the toe portion of the shoe.

160. A pulling-over and lasting machine having, in combination, means for pulling-over a shoe, means for lasting the toe portion of the shoe, additional means for forcing the upper over the last bottom at the sides of the shoe, and power operated means for actuating said additional means and for inserting securing tacks at the sides of the shoe including tacks located for anchoring a binder in position to hold the toe portion of the upper in lasted relation to the shoe innersole.

161. A machine of the class described, having, in combination, end lasting wipers arranged to work an upper backwardly over the toe portion of a last into lasted position, a rest for engaging an innersole upon the last bottom, and power operated means for actuating said engaging means lengthwise of the last while it is in engagement with the innersole.

162. A machine of the class described, having, in combination, end lasting means constructed and arranged to rub an upper upwardly along the side faces of a last and inwardly over the bottom of the last, a rest for engaging the forepart of the innersole, and means by which said rest can be actuated forwardly while in operative engagement with the shoe.

163. In a pulling-over and lasting machine, the combination with side grippers for gripping and pulling-over an upper at the sides of a last, said grippers being constructed and arranged to permit relative movement for adjusting the upper about the last while they hold the upper, a toe gripper for gripping and pulling the upper at the toe, and a lasting device consisting of lasting plates separate from the gripping devices for engaging the toe portion of the upper while it is held by the toe gripper and for working into finally lasted position a continuous section of upper extending from one side of the last around the toe to the other side of the last.

164. In a pulling-over and lasting machine, the combination with power operating means for pulling-over a shoe comprising grippers for engaging an upper at opposite sides and at the toe of the last, and actuating means for straining the upper between the grippers and the last, of relatively movable wiper plates constructed and arranged to adjust themselves automatically to the shape of the toe portion of the last, and means for actuating said wiper plates to work the upper into lasted position, said wiper plates engaging the upper while the toe gripper holds the upper under strain.

165. In a pulling-over and lasting machine, the combination with grippers for engaging an upper at opposite sides of a last and pulling it over the last, means for inserting tacks at the sides of the last to secure the upper in pulled-over position, and a gripper for engaging and pulling the toe portion of the upper, of means constructed and arranged to embrace the toe portion of the shoe, rub the upper upwardly along the side faces of the last, and then wipe the upper inwardly over the edge and bottom of the last into finally lasted position, said toe grippers being constructed and arranged to maintain the toe portion of the upper under strain during the wiping operation.

166. In a machine of the class described, end lasting mechanism comprising side wipers and an intermediate wiper to which the side wipers are pivotally connected at their inner ends, an actuator to which the intermediate wiper is pivotally connected, and means including an equalizing lever for connecting the outer ends of the side wipers with said actuator.

167. A pulling-over and lasting machine, having, in combination, power operated pulling-over means including means for straining an upper lengthwise and transversely of the last, and means for working into finally lasted position a continuous section of upper extending from one side of the last around the toe to the other side of the last.

168. A pulling-over and lasting machine, having, in combination, pulling-over means including means for straining an upper lengthwise and transversely of the last, said machine having means for relatively adjusting the pulled upper and the last, and means for working into finally lasted position a continuous section of upper extending from one side of the last around the toe to the other side of the last, said machine including capacity for right and left lateral adjustment of the pulling-over and the lasting means relatively for crooked lasts.

169. A pulling-over and lasting machine, having, in combination, power operated pulling-over means including grippers located at opposite sides of the ball of the last and arranged to permit relative movements to adjust the pulled upper about the last, and means for working into finally lasted position a continuous section of upper extending from adjacent to one side gripper around the toe of the last to the other side gripper.

170. A pulling-over and lasting machine, having, in combination, power operated pulling-over means, including a gripper to engage the toe portion of the upper and means for manually manipulating the pulling-over means to adjust the pulled upper upon the last, and means for working into lasted position a continuous section of upper extending from one side of the last around the toe to the other side of the last.

171. A pulling-over and lasting machine, having, in combination, power operated pulling-over means, including a gripper to engage the toe portion of the upper and means for manually actuating the gripper laterally, and relatively movable lasting wipers arranged for actuation to force the upper backwardly from the toe end of the last and inwardly from the side edges of the last.

172. A machine of the class described, having, in combination, a gripper arranged to pull the toe portion of an upper, means for manually shifting the gripper laterally to adjust the upper, and end lasting wipers arranged for actuation to force the upper backwardly from the toe end of the last and inwardly from the side edges of the last.

173. A machine of the class described, having, in combination, a gripper mounted for lateral adjustment and arranged to pull the toe portion of an upper, and end lasting mechanism comprising pivotally connected wiper plates, and means to actuate said plates to force the upper into finally lasted position.

174. A pulling-over and lasting machine, having, in combination, pulling-over means including a gripper to engage and pull the upper at the toe, means to effect lateral adjustment of said gripper, and lasting means constructed and arranged to work into finally lasted position a continuous section of upper extending from one side of the last around the toe to the other side of the last while the toe gripper holds the upper under tension.

175. In a pulling-over and lasting machine, the combination with a toe gripper, of side grippers for gripping and pulling-over an upper at the sides of a last, means to effect movement of said grippers and last to adjust the upper, and a lasting device consisting of lasting plates separate from the gripping devices for engaging the toe portion of the upper while it is held by the toe gripper and for working into finally lasted position a continuous section of upper extending from one side of the last around the toe to the other side of the last.

176. A machine of the class described having, in combination, last supporting means, a bottom rest, power operated means for relatively actuating the supporting means and bottom rest to clamp the shoe, wipers constructed and arranged to embrace the toe portion of a shoe and work into finally lasted position a continuous section of upper extending from one side of the last around the toe to the other side of the last, and operating mechanism for initially closing the wipers below the plane of the last bottom, rubbing the upper between the side of the last and the edge of the wipers upwardly to the last bottom and then wiping it over the last bottom into lasted position.

177. A machine of the class described having, in combination, last supporting means, a bottom rest, wipers constructed and arranged to embrace the toe portion of a shoe and work into finally lasted position a continuous section of upper extending from one side of the last around the toe to the other side of the last, operating mechanism for initially closing the wipers below the plane of the last bottom, rubbing the upper between the side of the last and the edge of the wipers upwardly to the last bottom and then wiping it over the last bottom to lasted position, and power operated mechanism for relatively actuating said last supporting means and bottom rest to clamp the shoe before the wipers are operated and to hold it clamped until the completion of the overwiping operation of the wipers.

178. A machine of the type in which a wiper is caused to embrace the shoe toe and to rub the upper upwardly to the edge of the shoe bottom and then wipe the upper inwardly over the feather of the innersole, having, in combination, pivotally movable toe embracing wipers, a rest engaging the shoe bottom over an extended area and determining the plane of the shoe bottom relatively to that of the wipers, and operating means for preliminarily closing the wipers to embrace the toe, relatively moving the last and the wipers to effect upward rubbing of the upper, arresting this movement before the wipers lose their frictional hold on the upper at the edge of the shoe, and advancing and closing the wipers to effect the overwiping of the upper.

179. A machine for working an upper over the forepart of a last having, in combination, end embracing wipers constructed and arranged to work into finally lasted position a continuous section of upper extending from one side of the last around the toe to the other side of the last and which have an upwardly wiping action in contact with the sides of the toe and an overwiping action across the edge of the last bottom, and means for relatively moving the last and wipers to effect said two wiping actions, said machine having means predetermining the extent of said upwardly wiping action to prevent the wipers from losing their frictional hold on the upwardly wiped upper stock before it is wiped inwardly.

180. In a machine of the class described the combination with power operated means for gripping and pulling the upper of the forepart of a shoe, of wipers constructed and arranged to embrace the toe portion of the shoe, rub the upper upwardly along the side face of the last and then wipe the upper inwardly over the edge of the last, and means for relatively moving the gripping means, the wipers and the last and causing the gripping means to maintain the upper under strain during the operation of the wipers.

181. In a machine of the class described the combination with wipers constructed and arranged to embrace the toe portion of a shoe, of means for relatively actuating the last and said wipers to rub the upper upwardly along the side face of the last, other means for operating the wipers to wipe the upper inwardly over the edge and bottom of the last, and means for gripping the upper before the actuation of the wipers, said means operating automatically to maintain the upper under strain while the wipers are operating.

182. In a machine of the class described the combination of wiper plates constructed and arranged to adapt themselves automatically to the shape of the toe portion of the last, means for moving the wipers and the last relatively to rub the upper upwardly toward the bottom of the last, means for moving the wipers inwardly over the edge and bottom of the last, and means for gripping the upper acted upon by the wipers before said wipers are operated and holding the upper during the operation of the wipers.

183. A machine of the class described having, in combination, wipers constructed and arranged to work into finally lasted position a continuous section of upper extending from one side of the last around the toe to the other side of the last, means to engage the shoe insole, means acting through the upper of the forepart of the shoe to engage the last, said two engaging means being normally separated to permit free introduction of a shoe between them, and operating mechanism for the wipers and for said engaging means arranged to cause said means to seize the shoe and automatically determine the plane of the feather of the insole relatively to the plane of the wipers in advance of the action of the wipers and to cause said engaging means to maintain control of the shoe during the action of the wipers.

184. A machine of the class described having, in combination, wipers constructed and arranged to work into finally lasted position a continuous section of upper extending from one side of the last around the toe to the other side of the last, mechanism to operate the wipers, means acting through the upper of the forepart of the shoe to engage the last, coöperating means formed to engage the insole at a plurality of points to position the shoe with the plane of the feather substantially parallel with the plane of the wipers, said upper engaging and insole engaging means being normally separated to permit free introduction of a shoe between them, and power operated mechanism for actuating said engaging means to seize the shoe in advance of the action of the wipers, to maintain control of the shoe during the action of the wipers, and to release the shoe at the end of the lasting operation.

185. A machine of the class described having, in combination, wipers constructed and arranged to work into finally lasted position a continuous section of upper extending from one side of the last around the toe to the other side of the last, mechanism for operating the wipers to do their work, means for engaging the shoe insole at a plurality of points located a substantial distance apart, means acting through the upper of the forepart of the shoe to engage the last, said upper engaging and insole engaging means being normally separated to permit free introduction of a shoe between them, means to assist the operator in locating the shoe for the operation of the wipers, and power operated mechanism for causing said engaging means to take hold of the shoe, establish the plane of the feather of the insole substantially in the plane of overwiping action of the wipers, and maintain control of the shoe during the operation of the wipers.

186. A machine of the class described having, in combination, end embracing means including wipers constructed and arranged to work into finally lasted position a continuous section of upper extending from one side of the last around the toe to the other side of the last, a bottom rest formed to engage the insole at points each in a predetermined horizontal plane to position the insole with its feather in a plane substantially parallel with the wipers, means acting through the upper of the forepart of the shoe and coöperating with the bottom rest to clamp the shoe, said bottom rest and said means being normally separated to permit free introduction of an assembled shoe between them, grippers arranged at opposite sides of the toe and with reference to which the shoe is located for the operation of the machine, power operated means for causing said clamping means to take hold of the shoe and maintain it so located during the operation of the machine, and means for relatively actuating said end embracing means and last to cause said means to embrace the toe of the last below the insole, to rub the upper up the side of the last to the plane of the feather, and then to wipe the upper over upon the feather into position to be secured.

187. A machine of the class described having, in combination, a frame or post, wipers supported thereon and constructed and arranged to work into finally lasted position a continuous section of upper extending from one side of a last around the toe to the other side of the last, and means for operating the wipers to do their work, said wipers with their operating mechanism being arranged to present an open shoe-receiving space in front of and about the wipers, means to assist the operator in locating the shoe for the operation of the machine, and power operated means to take hold of the shoe and control its position with relation to said wipers during the operation of the wipers.

188. A machine of the class described having, in combination, a frame or post, wipers supported thereon and constructed and arranged to work into finally lasted position a continuous section of upper extending from one side of a last around the toe to the other side of the last, and means for operating the wipers to do their work, said wipers with their operating mechanism being arranged to present an open shoe-receiving space in front of and below the wipers, means to assist the operator in locating the shoe for the operation of the machine, means engaging the upper and the lower sides of the shoe to hold it in operative relation to the wipers and power operated mechanism for actuating the shoe holding means to seize the shoe and come to rest and for actuating the shoe holding means after the operation of the wipers to release the shoe and return to open position for the presentation of another shoe.

189. A machine of the class described having, in combination, grippers for engaging the toe portion of an upper, power operated means for relatively actuating the grippers and the last to updraw the toe portion of the upper, toe embracing wipers comprising relatively movable wiper plates, and means for actuating them to do their work, said wipers being mounted for movement transversely of the last and relatively to the upper gripping means to adapt themselves to the shape and position of the toe.

190. A machine of the class described comprising in combination, a frame or post and devices for working on a shoe which are located on the frame in an overhead position with relation to the shoe and are arranged to present an open shoe-receiving space in front of and below said devices, means to assist the operator in locating the shoe in the machine, and means to take hold of the shoe and to maintain it so located without assistance from the operator, said devices for working on the shoe including wipers constructed and arranged to work into finally lasted position a continuous section of upper extending from one side of the last around the toe to the other side of the last, and means for relatively actuating said wipers and last to cause the wipers to embrace the toe of the last below the sole face, rub the upper up the side of the last to the plane of the last bottom, and then wipe the upper over upon the feather of the innersole into position to be secured.

191. A machine of the class described comprising in combination, a frame or post and devices for working on a shoe which are located on the frame in an overhead position with relation to the shoe and are arranged to present an open shoe-receiving space in front of and below said devices, grippers arranged at opposite sides of the end of the toe in position to assist the operator in locating the shoe in the machine, a sole rest, means for causing the grippers to seize the upper, means for relatively actuating the grippers and the sole rest and last to put the upper under tension about the last, last supporting means engaging under the shoe in opposition to the sole rest, said rest, grippers and last supporting means operating to maintain the location of the shoe without assistance from the operator, said devices for working on the shoe including toe embracing wipers between which and the side of the last the upper is rubbed up to the edge of the shoe bottom, and means for actuating said wipers to wipe the upper into lasted position over upon the shoe bottom.

192. In a machine of the class described, the combination with means for supporting a last, of wipers constructed and arranged relatively to said last supporting means to embrace the toe portion of the shoe, means for actuating said wipers to rub the upper upwardly along the side face of the last, and means to then wipe the upper inwardly over the edge of the last, and means for engaging the upper to maintain the upper under strain during the operation of the wipers.

193. In a machine of the class described the combination, with power operated means for engaging the upper of a shoe at the toe, of wipers constructed and arranged to embrace the toe portion of the shoe, rub the upper upwardly along the side face of the last, and then wipe the upper inwardly over the edge of the last, said engaging means being constructed and arranged to maintain the upper under strain during the operation of the wipers.

194. In a machine of the class described the combination, with a shoe support and wipers constructed and arranged relatively to the support to embrace the toe portion of a shoe, of means for relatively actuating the support and said wipers to rub the upper upwardly along the side face of the last, other means for operating the wipers to wipe the upper inwardly over the edge and bottom of the last, and power operated means for engaging the toe portion of the upper before the operation of said wipers and maintaining it under strain while the wipers are operated.

195. In a machine of the class described the combination of wiper plates constructed and arranged to adapt themselves automatically to the shape of the toe portion of the last, means for relatively moving the wipers and the last to rub the upper upwardly toward the bottom of the last, means for moving the wipers inwardly over the edge and bottom of the last, and power operated means for engaging the upper at the toe before said wipers are operated and holding the upper during the operation of the wipers.

196. A machine for working over a last the forepart of a shoe upper having, in combination, toe embracing wipers, means for engaging the insole at a plurality of points to level the shoe bottom, and coöperating means acting through the upper of the forepart of the shoe to clamp the last, automatically intermittent power driven mechanism for effecting the leveling and clamping operations and come to rest at a predetermined point holding the shoe, and means for closing the wipers below the plane of the shoe bottom, rubbing the upper between the side of the last and the edge of the wipers upwardly to the last bottom and then wiping it over the feather of the insole to lasted position, said power operating mechanism acting when the machine is again started to release the shoe and return the power driven parts to starting position.

197. A machine for working over a last the forepart of a shoe upper having, in combination, toe embracing wipers, means for engaging the insole at a plurality of points to level the shoe bottom and coöperating means acting through the upper of the forepart of the shoe to clamp the last, said toe embracing wipers operating by relative movement of the last and the wipers to rub the upper upwardly to the edge of the shoe bottom and then to wipe the fringe of the upper inwardly over the feather of the insole while the shoe is held clamped as described, said machine having provision for predetermining the point at which the upward rubbing movement shall cease and the inward wiping movement begin, and automatically intermittent power driven mechanism to effect the leveling and clamping operations and come to rest at a predetermined point in the machine's cycle with the shoe clamped, and to release the shoe and return the power driven parts to original position when the machine is restarted.

198. A machine for working into finally lasted position the forepart of a shoe upper having, in combination, means for leveling and clamping a shoe and holding it in position to be lasted, means to tension the upper for the operation of the wipers, toe embracing wipers, operating means for initially closing the wipers, relatively moving the wipers and last to effect upward rubbing of the upper, arresting the rubbing movement before the wipers lose their frictional hold on the upper at the edge of the shoe bottom, and for advancing and closing the wipers to wipe the upper over the feather of the insole while the upper is tensioned and the shoe is clamped, and automatically intermittent power driven mechanism for effecting the tensioning, clamping and holding operations arranged to stop at a predetermined point in the machine's cycle and thereafter proceeding to release the shoe and automatically return the power driven parts to starting position.

199. A machine for giving final lasted form to the toe portion of a shoe having, in combination, wipers constructed and arranged to embrace the shoe from one side of the last around the toe end to the other side of the last, means to engage and hold the portion of upper to be acted upon by said toe embracing wipers, shoe holding mechanism comprising a shoe bottom rest which is constructed and arranged to level the forepart of the last longitudinally and transversely for the operation of the wipers and opposed last supporting means normally separated from the bottom rest, the shoe holding mechanism being constructed and arranged to permit free introduction of the shoe, to have unrestricted control of the shoe during said leveling operation, and thereafter to hold the shoe rigidly for the operation of the wipers, and means for operating the wipers and for operating the shoe holding means.

200. A machine of the class described, having in combination, end lasting wipers movable upwardly and inwardly to wipe the upper toward and over the edge of a last, and means occupying a predetermined relation to the plane of the bottom of the shoe for limiting the upward movement of the lasting plates.

201. A machine of the class described, having in combination, end lasting wipers, means for moving the plates upwardly along the sides of the last and inwardly over its bottom to wipe the upper into lasted position, a shoe bottom engaging member, and a stop occupying a predetermined relation to said member during the operation of said wipers to limit their upward movement when they reach the position to wipe the upper inwardly over the last edge.

202. A machine of the class described having, in combination, end lasting wipers arranged to wipe the upper up the side of the last and inwardly over the last bottom, and means to prevent the wipers from rising high enough relatively to the last bottom to lose their frictional hold on the upwardly wiped stock before they wipe inwardly.

203. A machine of the class described, having, in combination, end lasting wipers, means to raise them in wiping contact with the upper on the sides of the last, and means to close them to lay the upper over the edge and down upon the bottom of the shoe, and a stop to limit the rise of the wipers and determine the plane of their inward movement.

204. A machine of the class described having, in combination, lasting plates shaped to embrace the toe portion of a shoe, and means for actuating said plates upwardly and then inwardly to wipe the upper about and over the toe of the last, and means for stopping the upward movement when the plane is reached for the inward movement to take place.

205. A machine of the class described having, in combination, end lasting wipers shaped to embrace the toe portion of a shoe, and means relatively actuating said wipers and the last to wipe the upper upwardly about the sides and inwardly over the toe, and means for limiting the upward wipe at the point where the inward wipe should begin.

206. A machine of the class described, having in combination, end lasting means movable upwardly to rub the upper on the side and to lay it inwardly on the edge of a last, means to engage the bottom of the last, and a stop having a definite position relative thereto to arrest the upward movement of the lasting means at the edge of the last.

207. A machine of the class described, having in combination, end lasting means movable upwardly on the side and inwardly on the edge of a last, means to engage the bottom of the last, and a stop for the lasting means adjustable relatively thereto.

208. In a machine of the class described having grippers for pulling an upper on a last and constructed and arranged to permit relative movement of the grippers and the last to adjust the upper about the last, the combination with means for working the upper into lasted position about the toe portion of the last, of power operated means for securing the upper.

209. In a machine of the class described, the combination with power operated means for pulling an upper about a last, said means being constructed and arranged to permit movement for adjusting the upper about the last while under pulling strain, of means for thereafter lasting the toe portion and adjacent side portions of the shoe.

210. A machine of the class described having, in combination, wipers constructed and arranged to work into finally lasted position a continuous section of upper extending from one side of the last around the toe to the other side of the last, a bottom rest formed to engage the sole at a plurality of points spaced a substantial distance apart transversely and lengthwise of the shoe to position the sole with its feather in a plane substantially parallel with the wipers, means acting through the upper of the forepart of the shoe and coöperating with the bottom rest to hold the shoe firmly throughout the operation of the wipers, said bottom rest and coöperating means being normally separated to permit free introduction of a shoe between them, grippers located at opposite sides of the toe and with reference to which the shoe is located for the operation of the machine, and automatic operating means for causing said engaging means to take hold of the shoe and control its position with relation to said wipers during the operation of the wipers.

211. A pulling-over and lasting machine having, in combination, means arranged for positioning an assembled shoe sole face uppermost and in a plane oblique to the horizontal with the upper extending over the forepart of the last visible to the operator standing in working relation to the shoe, means for engaging the upper at the opposite sides and toe end of the forepart of the shoe, mechanism to operate the engaging means to pull the upper and come to rest holding the upper under tension for inspection, means to complete the pulling-over and fasten the upper at the sides of the forepart of the shoe, and additional means for lasting the toe portion of the shoe.

212. A pulling-over and lasting machine having, in combination, means for positioning an assembled shoe sole face uppermost and in a plane oblique to the horizontal with the upper extending over the forepart of the last visible to the operator standing in working relation to the shoe, power-operated means for pulling-over the shoe, means for arresting the pulling-over with the upper held under tension for inspection and adjustment, and means arranged for operation upon the upper so held for lasting the toe portion of the shoe while the shoe is continued sole face uppermost.

213. A pulling-over and lasting machine having, in combination, means for positioning an assembled shoe sole face uppermost and in a plane oblique to the horizontal with the upper extending over the forepart of the last visible to the operator standing in working relation to the shoe, power operated means for pulling-over the shoe, means for arresting the pulling-over with the upper held under tension for inspection and adjustment, and lasting means constructed and arranged to embrace the toe portion of the shoe while the upper is held under tension by the pulling-over means and to conform to the side faces of the last a continuous section of the upper extending around the toe while the shoe is continued sole face uppermost.

214. A pulling-over and lasting machine having, in combination, means for positioning an assembled shoe sole face uppermost and in a plane oblique to the horizontal with the upper extending over the forepart of the last visible to the operator standing in working relation to the shoe, means for pulling-over the shoe, means for arresting the pulling-over with the upper held under tension for inspection and adjustment, and lasting means comprising instrumentalities between which and the last there is relative movement in the direction to conform the upper to the side faces of the last progressively toward the edge of the last bottom while the upper is held under tension by the pulling-over means and between which and the last there is relative movement to wipe the upper over the shoe bottom, said pulling-over means being constructed and arranged for the tension to be released to give up stock to the overwiping means after the lasting means has assumed control of the stock.

215. In a machine for conforming uppers to lasts, means to position a shoe with the portion of the upper which extends over the forepart of the last visible to the operator standing in working relation to the shoe and the sole face of the shoe away from the operator, toe embracing wipers, and means to operate the wipers to wipe the upper upwardly about the side faces of the last while the shoe is so positioned and to wipe the upper into lasted position upon the shoe bottom.

216. In a machine for conforming uppers to lasts, means to position a shoe with the portion of the upper which extends over the forepart of the last visible to the operator standing in working relation to the shoe and predetermining the plane of the sole face of the forepart of the shoe bottom, toe embracing wipers, means for guiding the wipers in parallelism with the plane in which the sole face of the last is positioned, and means for operating the wipers to last the toe portion of the shoe.

217. A pulling-over and lasting machine having, in combination, means to pull over the upper, means to predetermine the plane of the shoe bottom, lasting means, means for guiding the lasting means in parallel relation to the predetermined plane of the last bottom, and means for operating the lasting means to last the toe portion of the shoe.

218. A pulling-over and lasting machine having, in combination, means to pull the upper, toe embracing wipers, means to predetermine the plane of wiping action of the wipers, means to position the last with the bottom of its forepart parallel with the plane of the wipers, and means for operating the wipers.

219. A pulling-over and lasting machine having, in combination, means to pull over the upper, means to predetermine the plane of the shoe bottom, means to overdraw and secure the upper at the sides of the shoe, and lasting means guided in parallelism with said predetermined plane of the shoe bottom and constructed and arranged for operation to last the toe of the shoe.

220. A pulling-over and lasting machine having, in combination, means for gripping an upper at the toe and at opposite sides of the forepart of a last and pulling-over the shoe, end embracing wipers for lasting the shoe, and means to predetermine the plane of the forepart of the shoe bottom and hold it in parallelism with the plane of action of the end embracing wipers.

221. A pulling-over and lasting machine having, in combination, means to pull over a shoe including grippers arranged to engage the upper at the toe and the sides of the forepart of the shoe and means to force the upper over the innersole at the sides of the shoe and to insert tacks which secure the upper at the sides of the shoe and are adapted to serve as toe binder anchor tacks, and means to shape the upper to the side faces of the toe and wipe it inwardly over the toe bottom into position to be secured by a toe binder.

222. A pulling-over and lasting machine having, in combination, means to pull an upper and to overdraw and secure it at the sides of the forepart while holding it under tension at the toe, lasting means to engage the tensioned toe portion of the upper and wipe it into position to be secured, and means to release the toe tensioning means while the lasting is being performed.

223. A pulling-over and lasting machine having, in combination, instrumentalities and operating means therefor to pull an upper and to overdraw and to secure the upper at the sides of the forepart while holding it under tension at the toe, and means to last a continuous section of upper extending from one side around the end to the other side of the toe.

224. A pulling-over and lasting machine having, in combination, pulling-over means, power operated mechanism for driving the pulling-over means, means to interrupt the pulling-over operation with the upper held under tension at the toe of the shoe by the pulling-over means, and lasting means arranged for operation during such interruption to work over the edge of the last bottom a continuous section of the tensioned upper extending around the toe, said machine being constructed and arranged to cause the pulling-over means to give up tensioned stock to allow the lasting means to work it into lasted position and to cause the driving mechanism to release the shoe after the lasting is completed.

225. A pulling-over and lasting machine having, in combination, pulling-over means, power operated mechanism for driving the pulling-over means, means to interrupt the pulling-over operation with the upper held under tension at the toe of the shoe by the pulling-over means, and lasting means arranged for operation during such interruption to work over the edge of the last bottom a continuous section of the tensioned upper extending around the toe.

226. A machine of the class described having, in combination, pulling-over means, constructed and arranged for movement to effect adjustment of the upper about the last, means for holding the last stationary while the upper is being so adjusted, operating mechanism for the pulling-over means constructed and arranged to permit the pulling-over operation to be interrupted after the upper has been pulled and adjusted into correct relation to the last and while the margin of the upper is free from the last around the toe, and means arranged to work a continuous section of the upper extending around the toe into lasted position and hold it while it is being fastened.

227. A machine of the class described having, in combination, shoe positioning means adapted to present a shoe for lasting with its top face toward the operator and its sole face away from the operator, toe embracing wipers, and supporting and operating mechanism for the wipers normally located on the same side of the plane of the last bottom as the innersole is located and adapted to move the wipers across said plane and substantially parallel therewith for working the upper into lasted position while permitting substantially an unobstructed view of the shoe during the toe lasting operation.

228. A machine of the class described having, in combination, grippers arranged to engage an upper at the end and opposite sides of the forepart of a last, operating means for relatively moving the grippers and the last to pull the upper and hold it under tension, and means arranged relatively to the grippers to engage the upper below a gripper and rub the upper upwardly over the side face of the last and toward its edge in the direction in which the gripper is pulling.

In testimony whereof I have signed my name to this specification in the presence of two subscribing witnesses.

RONALD F. McFEELY.

Witnesses:
CHARLES H. HOYT,
ARTHUR L. RUSSELL.

Copies of this patent may be obtained for five cents each, by addressing the "Commissioner of Patents, Washington, D. C."

Corrections in Letters Patent No. 1,135,949.

It is hereby certified that in Letters Patent No. 1,135,949, granted April 13, 1915, upon the application of Ronald F. McFeely, of Beverly, Massachusetts, for an improvement in "Machines for use in the Manufacture of Boots and Shoes," errors appear in the printed specification requiring correction as follows: Page 4, line 68, for the word "and" read *end;* page 13, line 26, claim 35, for the word "relative" read *relatively;* same page, lines 72–73, claim 40, and lines 79–80, claim 41, strike out the word "operating"; page 16, line 99, claim 80, strike out the word "stationary", and line 105, strike out the article "the", second occurrence and insert the words *a stationary;* page 17, line 45, claim 88, for the word "for" read *of;* same page, line 66, claim 90, before the word "shoe" insert the article *the;* same page, line 93, strike out the words "a stationary" and insert the article *the;* same page and claim, line 96, strike out the article "the" and insert the words *a stationary;* same page, line 115, claim 95, for the word "meads" read *means;* page 21, lines 75–76, claim 138, for the word "portion" read *position;* page 24, line 89, claim 178, for the word "to" read *toe;* and that the said Letters Patent should be read with these corrections therein that the same may conform to the record of the case in the Patent Office.

Signed and sealed this 12th day of October, A. D., 1915.

[SEAL.]
R. F. WHITEHEAD,
*Acting Commissioner of Patents.*

Cl. 12—4.